(12) United States Patent
Beck et al.

(10) Patent No.: US 8,706,313 B2
(45) Date of Patent: Apr. 22, 2014

(54) AUTO-COMPENSATING POWER CONVERTER

(75) Inventors: David L. Beck, Manor, TX (US); Demetri Giannopoulos, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 485 days.

(21) Appl. No.: 12/883,839

(22) Filed: Sep. 16, 2010

(65) Prior Publication Data

US 2011/0071700 A1 Mar. 24, 2011

Related U.S. Application Data

(60) Provisional application No. 61/244,187, filed on Sep. 21, 2009, provisional application No. 61/370,965, filed on Aug. 5, 2010.

(51) Int. Cl.
*G05D 3/12* (2006.01)

(52) U.S. Cl.
USPC ............................... 700/298; 700/31; 700/37

(58) Field of Classification Search
USPC ........................... 323/234; 700/286, 297, 298
See application file for complete search history.

(56) References Cited

U.S. PATENT DOCUMENTS

| 7,743,266 | B2 | 6/2010 | Chapuis |
| 8,036,762 | B1 * | 10/2011 | Young et al. ..................... 700/37 |
| 2004/0196013 | A1 | 10/2004 | Chen et al. |
| 2010/0117615 | A1 | 5/2010 | Prodic et al. |

\* cited by examiner

*Primary Examiner* — Carlos Ortiz Rodriguez
(74) *Attorney, Agent, or Firm* — Meyertons Hood Kivlin Kowert & Goetzel, P.C.; Jeffrey C. Hood

(57) ABSTRACT

An auto-compensation method for compensating power regulators configured to generate a regulated output voltage. Auto-compensation may be performed dynamically by determining various coefficients of a compensation function used in compensating the power regulator, based on assumptions about the structure of the regulator and corresponding filters. The method may be used to determine at least the DC loop gain and the position of the compensation zeros, without requiring any prior knowledge of the values of the various components of the system. Furthermore, the selection of the compensation parameters (loop gain, position of zeroes) may be based on measurement of various state variables of the actual power converter, and adjustment of the various coefficients of the compensation function according to the measurements. Since no power-plant model of the power regulator is used, inaccuracies that would be inherent using any method that employs a model of the system instead of the system itself may be eliminated.

33 Claims, 23 Drawing Sheets

AUTO-COMPENSATING POWER CONVERTER

PRIORITY CLAIM

This application claims benefit of priority of provisional application Ser. No. 61/244,187 titled "Auto-Compensating Power Converter", whose inventors are David L. Beck and Demetri Giannopoulos, and which was filed Sep. 21, 2009, and further claims benefit of priority of provisional application Ser. No. 61/370,965 titled "Auto-Compensating Power Converter", whose inventors are David L. Beck and Demetri Giannopoulos, and which was filed Aug. 5, 2010. Provisional application Ser. No. 61/244,187 and provisional application Ser. No. 61/370,965 are both hereby incorporated by reference as though fully and completely set forth herein.

FIELD OF THE INVENTION

This invention relates to compensation of feedback systems and, more particularly, to adaptive compensation in digital power controllers.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
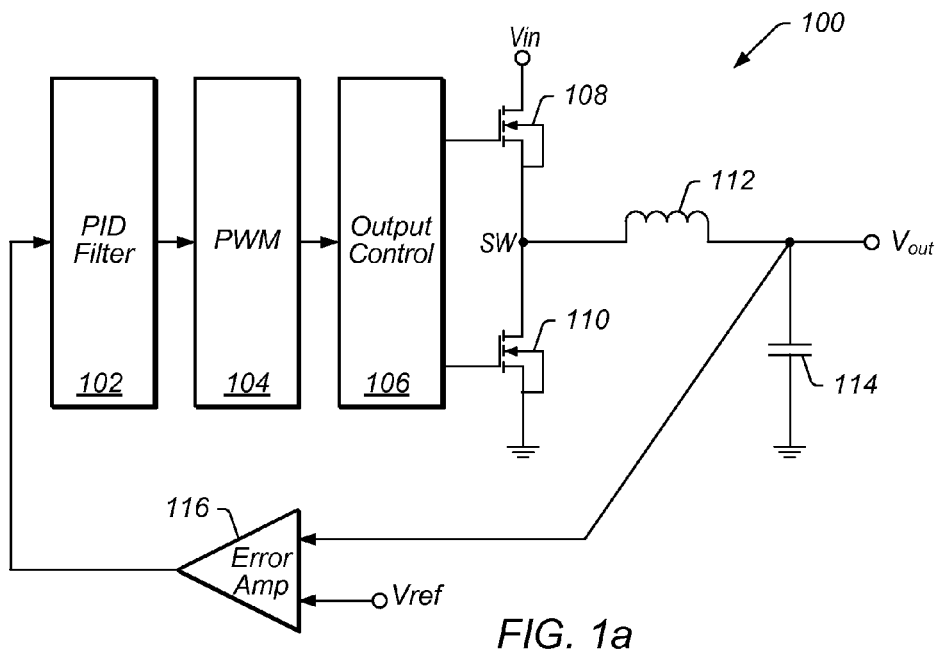
FIG. 1 shows one embodiment of a power regulator (Buck Regulator), according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF PREFERRED EMBODIMENTS

The rapid evolution and increased power consumption of commercial integrated circuits, such as microprocessors and graphics processors, has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL).

However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I²C (inter-IC communication) bus to coordinate control of all POL converters in the system.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (108 and 110) in order to produce a square-wave at their common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

For analog control, Type III compensation has typically been a popular choice for compensation of voltage mode switching power supplies. Many types and variations of compensation are available for digital control, but one of the most popular has been digital PID compensation, indicated in FIG. 1 by PID Filter 102, which may be configured to perform digital compensation and/or filtering in Regulator 100. In general, digital power control has been used in various instances in the power industry for some time. As the cost of digital controllers decreases, their increased use becomes more apparent, yet their relative value and advantage over more conventional analog controllers has been a matter of debate. The main question at the center of the debate is whether digital control can truly provide any substantive advantage over analog control.

Semiconductor process technology has developed to the point that digital circuitry definitely has a size advantage over analog circuitry. For example, an entire digital microcontroller may be built to the approximate size of a single (small) analog component: a capacitor. In addition, digital technology offers the potential to integrate and incorporate sophisticated control algorithms, which may simply be too complex, too large, or too expensive to implement as analog designs. An example of this problem is illustrated in "optimized deadtime control" or ODTC. ODTC is an innovative search algorithm, which adjusts the switching dead-times to optimize the efficiency of the power converter. Although analog implementations of "adaptive dead-time" have been around for some time, they did not include efficiency optimization but merely the prevention of cross conduction.

Another essential element of power supply operation is stability. Because of the complexity of the system stability under poorly defined (or even poorly understood) load and environmental conditions, compensation for stability may well be one of the areas where digital implementation may provide a decided advantage over analog solutions. Because of the computational efficiency and power of digital control, compensation is an area where digital solutions may have a distinct performance advantage over analog implementations.

As previously mentioned, one example of a feedback system may be directed to DC-to-DC conversion, which may be performed by a switching power regulator using two or more power transistors, which may operate to convert energy at one voltage to another voltage. In general, as used herein, the terms "voltage regulator", "point-of-load (POL) regulator", "power converter", and "power regulator" are used interchangeably to refer to a device configured to deliver current to a load through a regulated output voltage. Such a power regulator or power converter may perform voltage conversion, and may include not only feedback control circuitry, but also additional control circuitry configured to perform one or more functions related to voltage regulation and/or power regulation and control, in addition to performing voltage conversion and providing a regulated output voltage while delivering current to the load. A POL regulator may also be divided into the voltage converter section, which essentially comprises an output stage of the POL regulator, and control circuitry, which may comprise all other functionality of the POL regulator, including the regulating and control functions. In one set of embodiments, the control circuitry may be implemented on an integrated circuit, and coupled to an external output stage to construct a complete POL regulator. One power regulator, a Buck Regulator, was shown in FIG. 1*a*. In general, transistors 108 and 110 may be controlled such that they do not conduct current at the same time. Typically, when transistor 108 is turned on (HS is asserted), transistor 110 may be turned off (LS is de-asserted).

Modeling of the Power Plant

Figure 2A:
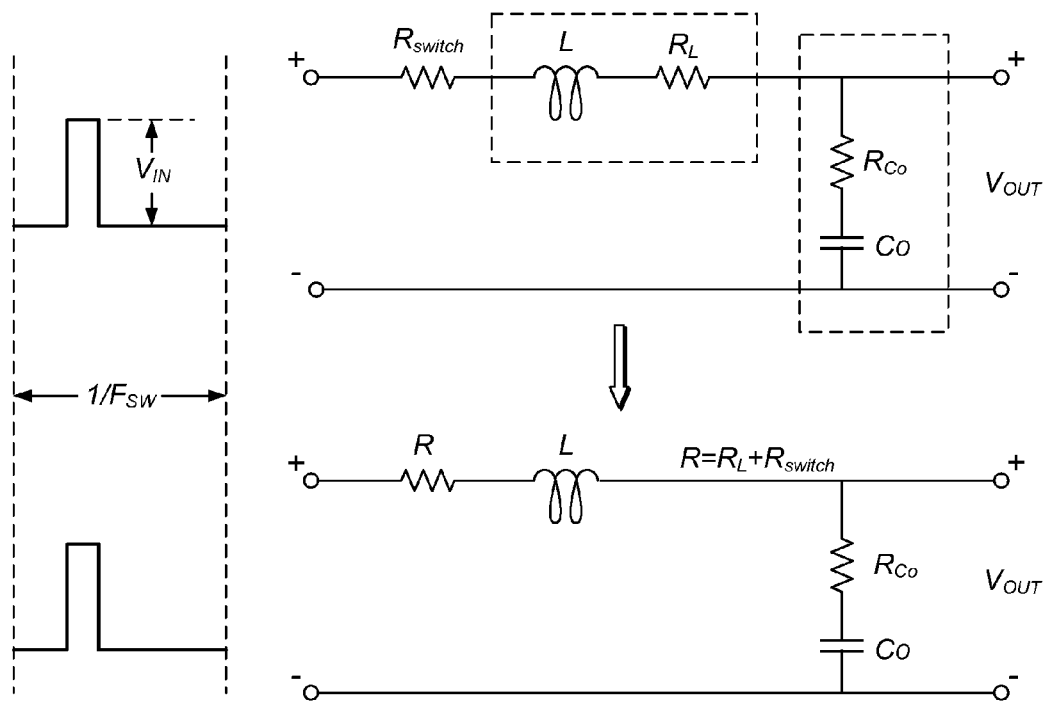
FIG. 2a shows one embodiment of a power plant model of a buck converter.

FIG. 2a shows the power plant model of a power regulator, such as buck converter 100 from FIG. 1a, for example, without a load. The transfer curve of the power plant with no load may then be expressed by the following equation:

$$g_{PS}(s)=V_{OUT}(s)/V_{IN}(s)=[1+s/(2*\pi*f_{zesr})]/[1+s/(2*\pi* f_{n,pow}*Q_{pow})+s^2/(2*\pi*f_{n,pow})^2], \quad (1)$$

where
$f_{n,pow}=1/[2*\pi*\mathrm{sqrt}(L*C_o)]$,
$Q_{pow}=1/(2*\zeta_{pow})=[1/(R+R_{Co})]*\mathrm{sqrt}[L/C_o]$,
$f_{zesr}=1/[2*\pi*R_{Co}*C_o]$
$Q_{pow}$ and $\zeta_{pow}$ denote the quality factor and damping factor of the power plant respectively, while $f_{n,pow}$ denotes the natural frequency. The term "sqrt" indicates "square root".

The transfer curve of the power plant with load $R_o$ (FIG. 2b) may be expressed by the following equation:

$$g_{PS}(s)=[R_o/(R_o+R)]*[1+s/(2*\pi*f_{zesr})]/[1+s/(2*\pi* f_{n,pow}*Q_{pow})+s^2/(2*\pi*f_{n,pow})^2], \quad (2)$$

where
$f_{n,pow}=1/\{2*\pi*\mathrm{sqrt}[(L*C_o)*(R_o+R_{Co})/(R_o+R)]\}$,
$Q_{pow}=\mathrm{sqrt}[(L/C_o)*(Ro+R_{Co})*(R_o+R)]/\{L+C_o*[R_{Co}*(R_o+R)+R_o*R]\}$,
$f_{zesr}=1/[2*\pi*R_{Co}*C_o]$.

Loop Compensation

Typically the compensation function used in the feedback loop of a buck converter introduces a pole near the origin (DC) and two zeroes near the natural frequency $f_{n,pow}$ of the power plant. It may be assumed that the zero due to the capacitor 'esr' (near the frequency $f_{zesr}$) can be ignored due to its high value. Then the compensation function may be rewritten as:

$$g_{comp}(s)=k*[1+s/(2*\pi*f_{n,comp}*Q_{comp})+s^2/(2*\pi* f_{n,comp})^2]/s \quad (3)$$

where $f_{n,comp}\cong f_{n,pow}$ with $f_{n,comp}$ representing the compensation frequency. $Q_{comp}$ represents the compensation quality factor. Individually, k, $f_{n,comp}$, and $Q_{comp}$ may be considered compensation coefficients, which together determine the DC loop gain and the position of the compensation zeros, effectively determining the compensation of the power plant according to the compensation function expressed in equation 3. In addition, these compensation coefficients may also together determine the position of compensation poles of the power plant according to the compensation function expressed in equation 3. This compensation function may achieve the following objectives:

high loop gain, e.g. high loop gain at DC where regulation takes place, low loop gain at high frequencies where noise needs to be attenuated, simple loop transfer curve that looks like a single pole near the origin (DC).

Auto-Compensation Method

Figure 1B:
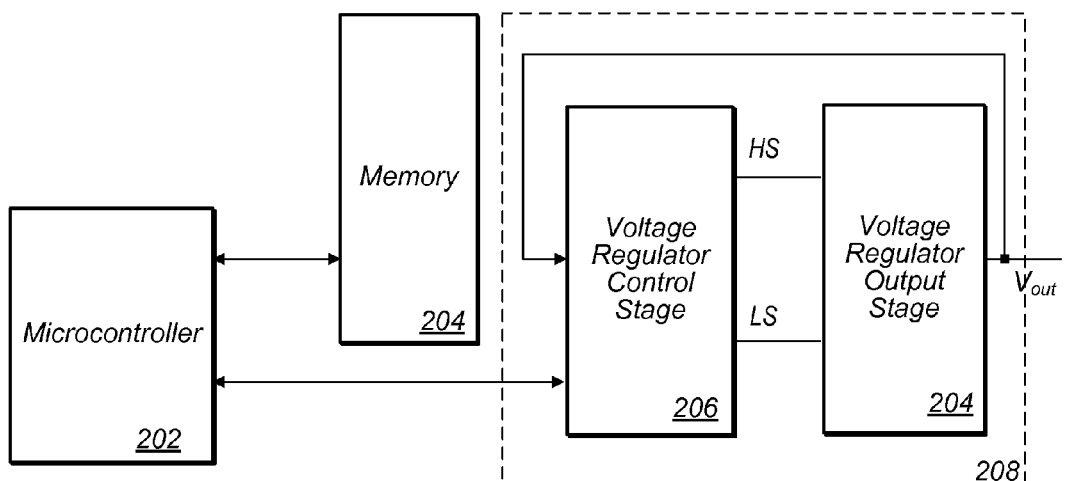
Figure 2B:
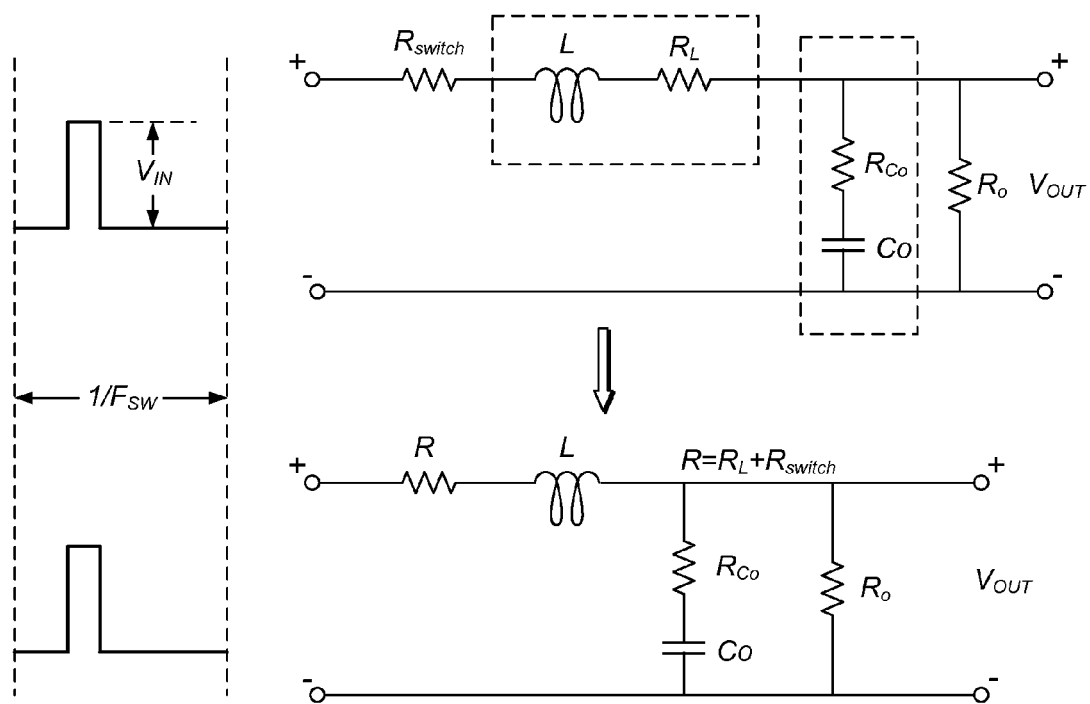
FIG. 2b shows one embodiment of a power plant model of a buck converter with a load.

Various embodiments of an auto-compensation method described herein may operate to determine the DC loop gain and the position of the compensation zeros, without requiring any prior knowledge of the system, based on certain assumptions about the system, and the expected operating frequency. Furthermore the selection of the compensation parameters (DC loop gain, position of zeroes) may be based on measurement of one or more state variables of the system, for example the measurement of the output voltage of the actual power converter. Since no model of the system is used, there may be no inaccuracies, which would be present when using any method that employs a model of the system instead of basing the selection of the compensation parameters on the system itself. It should be noted, that in order to obtain a desired phase margin, or a phase margin within desired limits, selection of the compensation parameters may be made in view of an assumption or advance knowledge about the overall structure of the power converter and filters. In other words, while the compensation parameters may be selected based on measured state variables, not based on nominal values derived from a model of the system, they may also be selected, in addition, based on an assumption and/or advance knowledge of the overall filter and power converter structure. For example, in one set of embodiments, it may be understood that the power converter to be compensated will be a Buck converter (e.g. a converter such as the one shown in FIG. 1), with an LC filter structure (e.g. as shown in FIGS. 2a and 2b). In summary, as noted above, knowledge of the component values of the filter and converter is not required, while knowledge of the structure of the filter and the type of the converter may be taken into consideration in selecting the compensation parameters.

Embodiments of the auto-compensation method described herein may be well suited, among others, to digital controllers that include a processor and memory. One such exemplary system is shown in FIG. 1b, in which a microcontroller (processor) 202 may interface with memory 204, and may also interface with the voltage regulator control stage 206 of a voltage regulator 208. Controller 202 may therefore operate to perform auto-compensation for voltage regulator 208 as will be further described below. It should also be noted that alternative embodiments to the embodiment shown in FIG. 1a are equally possible and are contemplated. For example, alternate embodiments may include application specific hardware, or a combination of hardware and software configured to perform the various functions implementing auto-compensation according to the principles described herein. The auto-compensation method may also be performed in any given application or system configuration for low output voltages (for instance 100 mV) before ramp-up to the regular output voltage (with no load applied), and/or before installation of the power converter in the given system configuration or application (with load or without load, for any output voltage). For example, the auto-compensation method may be performed with a regulated low output voltage (e.g. 100 mV) to determine the desired compensation parameters, prior to operating the system at the desired regular output voltage. If auto-compensation takes place in the application, then the coefficients (k, $f_{n,comp}$, $Q_{comp}$) of the compensation function may be re-calculated while operating at a low output voltage before each ramp-up of the output voltage to the desired regular operating value, to account for shifting of component values over time. Various embodiments of the auto-compensation method may include at least three steps: selection of an initial compensation function, selection of DC loop gain (requiring selection of coefficient k), and selection of coefficients $f_{n,comp}$, and $Q_{comp}$.

First Step: Selection of Initial Compensation Function

Auto-compensation may take place in closed loop operation. Therefore an initial compensation function may be selected to obtain a stable feedback loop for all practical values of the power plant component values. Initially a single compensation pole near origin and a low DC gain (k=$k_{init}$) may be chosen/specified. The choice of $k_{init}$ assumes that $k_{init}$ achieves a minimum loop gain required to regulate under steady state conditions at the nominal output voltage. The compensation function may be given by:

$$g_{comp}(s) = k_{init}/s. \quad (4)$$

Then the total loop gain may then become:

$$g_{loop} = k_{init} * k_1 * g_{PS}(s) * /s, \quad (5)$$

where $g_{PS}(s)$ is given by Eq. 1, and $k_1$ denotes the gain of the regulation loop contributed by other functions such as the pulse-width modulator (e.g. PWM block 104 of FIG. 1) and the error amplifier (e.g. error amplifier 116 of FIG. 1). This compensation function may ensure a stable loop for any practical power train component values (i.e. practical component values of the power converter), if a sufficiently low gain value k is chosen. The combination of a single compensation pole near the origin and a low DC loop gain may result in a unity gain frequency $f_{init,xo}$ lower than the natural frequency $f_{n,pow}$ of the power plant. Then, the phase margin of the loop gain $g_{loop}$ in Eq. 5 would be 90°, ensuring stable operation.

Since the choice of the initial parameter $k_{init}$ is dependent on the power converter controller, the auto-compensation method may be configured with the assumption that $k_{init}$ is selected based on prior knowledge of the minimum loop gain $g_{loop,min}$ that is sufficient to regulate under steady state conditions at the nominal regulated output voltage value. In other words, a sufficiently low DC gain would indicate the lowest possible gain at which the voltage regulator (power converter) is operating within its tolerance specifications. For example, $k_{init}$ (the initial value for k) during the initialization step may be selected to satisfy:

$$k_{init} << 2 * \pi * f_{n,pow}/(Q_{pow} * k_1), \quad (6)$$

where k1 denotes the DC gain contribution of the controller (e.g. the controller IC circuit blocks, excluding the filter implementation of the PID function). When $k_{init}$ is selected according to Eq. 5, the unity gain frequency $f_{init,xo}$ will be lower than the natural frequency of the power plant (as mentioned above):

$$f_{init,xo} < f_{n,pow}. \quad (7)$$

Thus, selecting $k_{init}$ according to Eq. 5 would yield a phase margin of approx. 90 degrees and sufficient loop gain margin. Any controller and power filter combination not meeting the requirements sufficient for initialization may be considered to fall outside the application space of interest.

Figure 3:
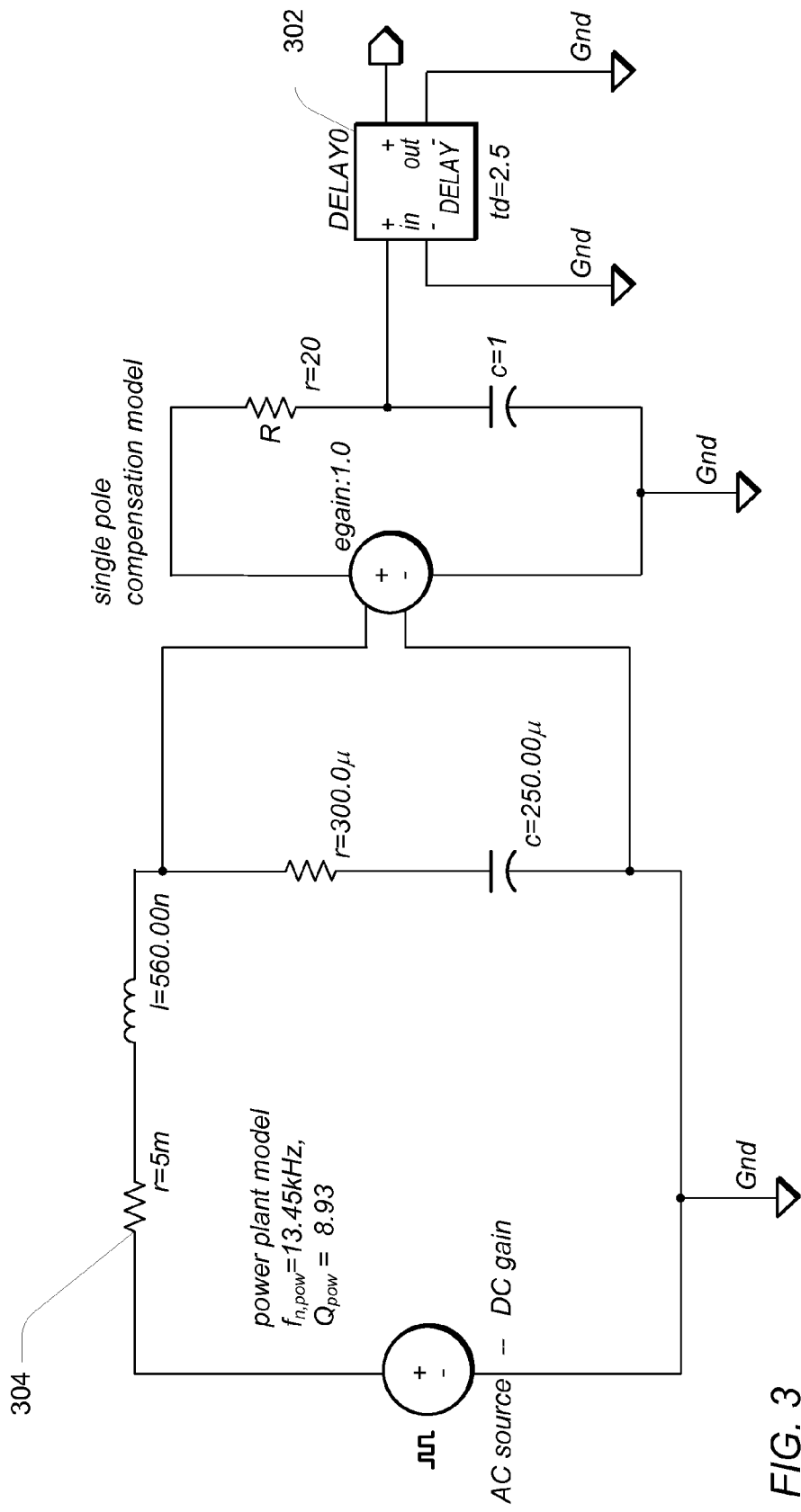
FIG. 3 shows one embodiment of loop gain modeling with single near-origin pole compensation.

FIG. 3 shows the model of an exemplary buck converter power plant and a single near-origin compensation pole used to simulate the loop transfer curve. All the component values are given as examples for the purposes of illustration, and other embodiments may include different values and different components as well, depending on the actual construction of the power plant. The model in FIG. 3 includes a delay element 302 modeling the delay that may be introduced by the digital implementation of the control circuitry that will be further described below under the heading: Implementation of auto-compensation method using a programmable digital controller. It may be assumed that the duty-cycle of the power converter is updated once per switching cycle, leading to the delay through delay element 302 equaling the switching period of the power converter. In this particular example, the switching frequency is assumed to be 400 kHz, resulting in a delay of 2.5 μs. The natural frequency $f_{n,pow}$ would then be 13.45 kHz and the quality factor $Q_{pow}$ would be 8.93 for the component values shown in FIG. 3.

Figure 4:
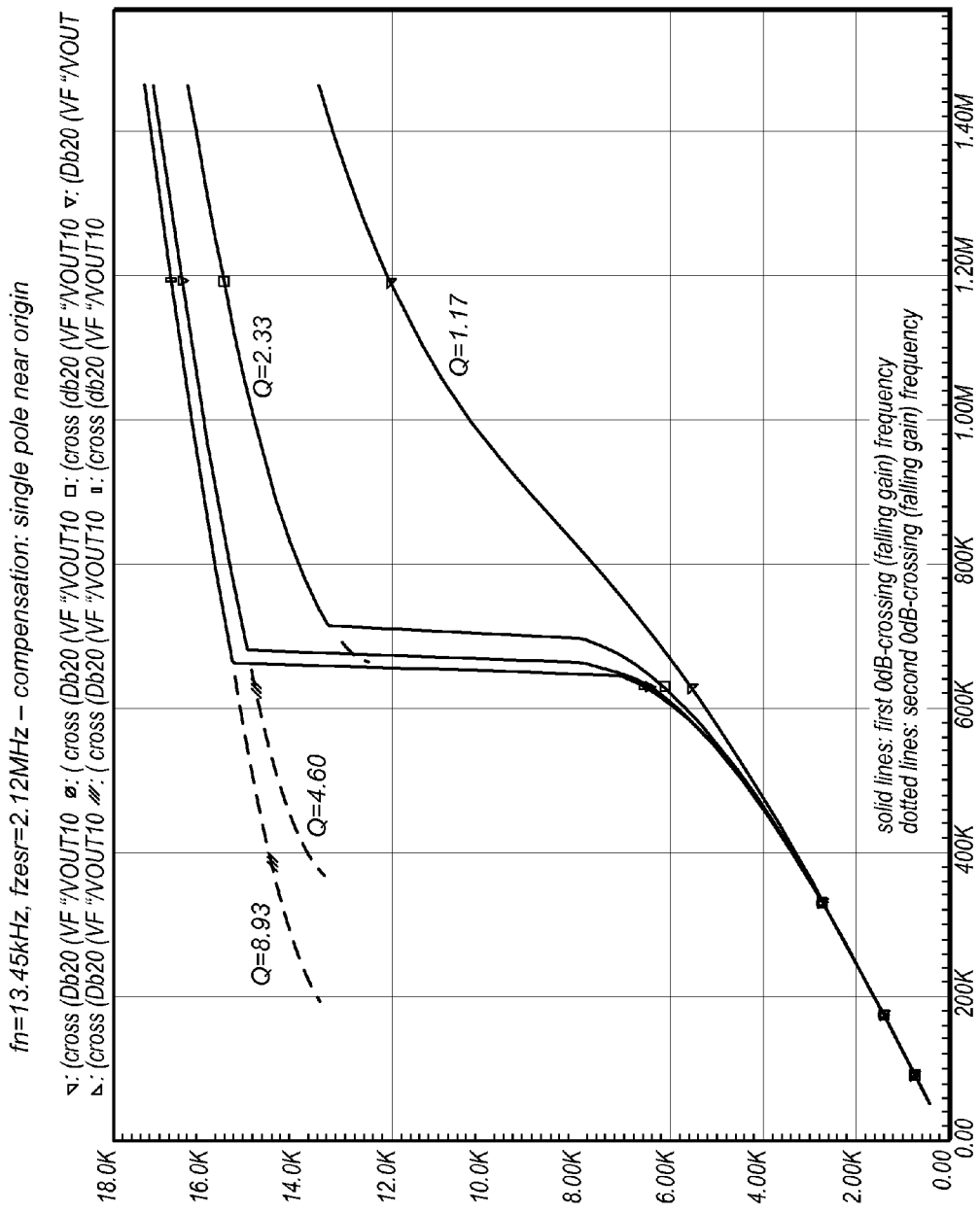
FIG. 4 shows function curves representing unity gain frequency vs. DC loop gain, (for $Q_{pow}$=1.17, 2.33, 4.60, 8.93) according to one embodiment.
Figure 5:
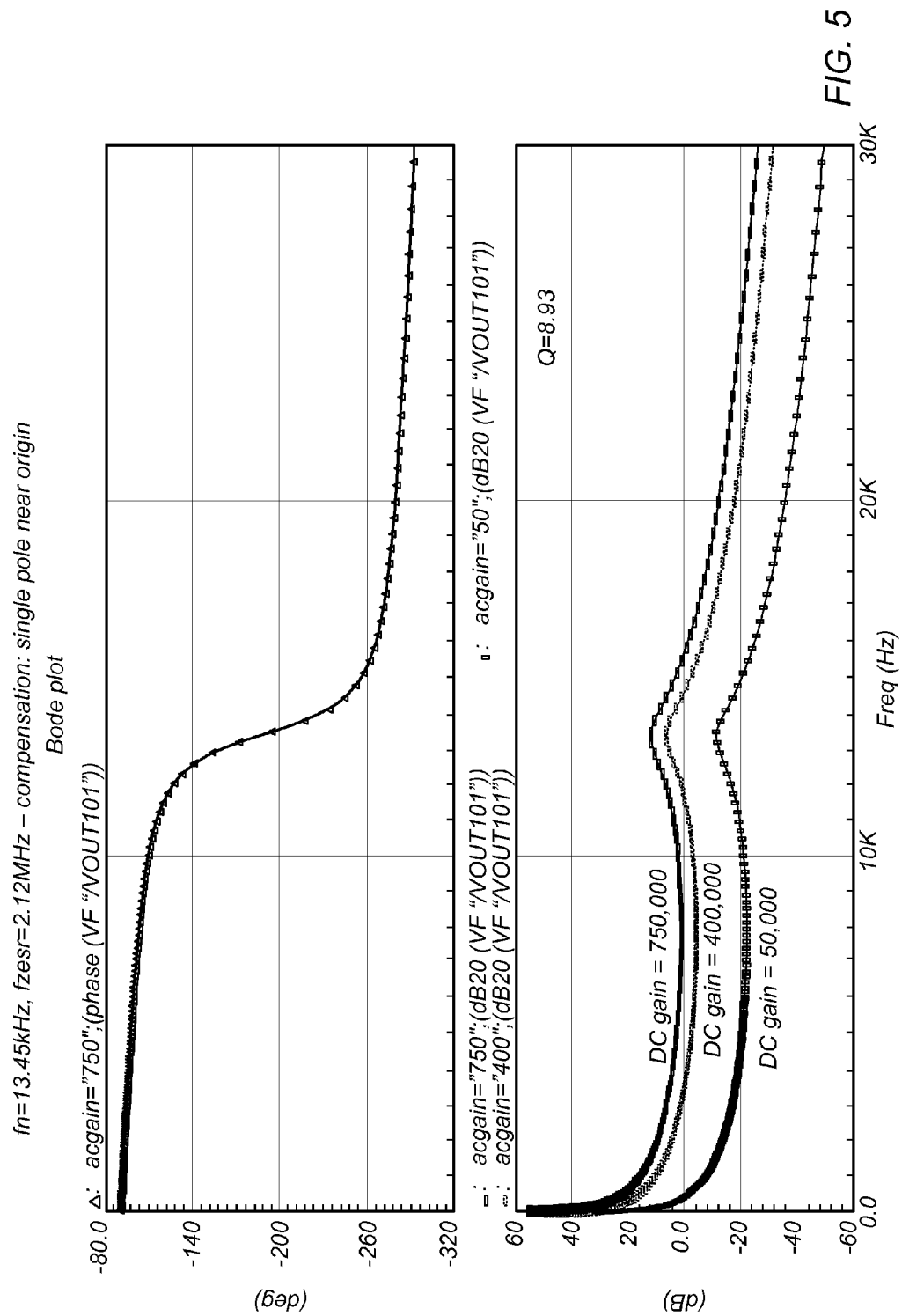
FIG. 5 shows a Bode plot of loop gain for $Q_{pow}$=8.93 (DC gain=50K, 400K, 750K) according to one embodiment.

The value of resistor 304 in FIG. 3 ($r = R_{switch} + R_L$) may be varied (changed) to obtain different quality factor $Q_{pow}$ values while keeping the natural frequency constant. FIG. 4 shows the unity gain frequency of the loop (which consists of the power plant and a single compensation pole near the origin) as a function of the DC loop gain for different values of the power stage quality factor $Q_{pow}$ (in the example shown, $Q_{pow}$=1.17, 2.33, 4.60, 8.93). For high $Q_{pow}$ values the (falling) loop gain crosses the 0 dB level at two frequencies for a range of DC loop gain values. A higher $Q_{pow}$ value may result in a wider range of DC gain values where two 0 dB-crossing frequencies may occur. The second (higher) 0 dB-crossing frequency may determine the unity-gain frequency of the loop gain. FIG. 5 shows the Bode plot of the loop gain for $Q_{pow}$=8.93 (high $Q_{pow}$ power plant). For low DC loop gain values (for instance 50K) the falling loop gain may cross 0 dB at a low frequency only. The resonant peak may not cross the 0 db level. Then, the phase would be approximately −90°, and the phase margin would be +90°, resulting in a stable loop. For higher DC loop gain values (for instance 400K) the resonant peak may also cross the 0 dB level. Finally for much higher DC loop gain values (for instance 750K) the resonant peak may not cross the 0 dB level at low frequencies at all. As seen in FIG. 5, for high DC loop gain values the unity-gain frequency may exceed the natural frequency $f_{n,pow}$ of the power plant. Furthermore the phase margin may be very low (reaching negative values) due to the sharp transition of the phase in the vicinity of the natural frequency $f_{n,pow}$ of the power plant. Therefore the loop may become unstable.

Figure 6:
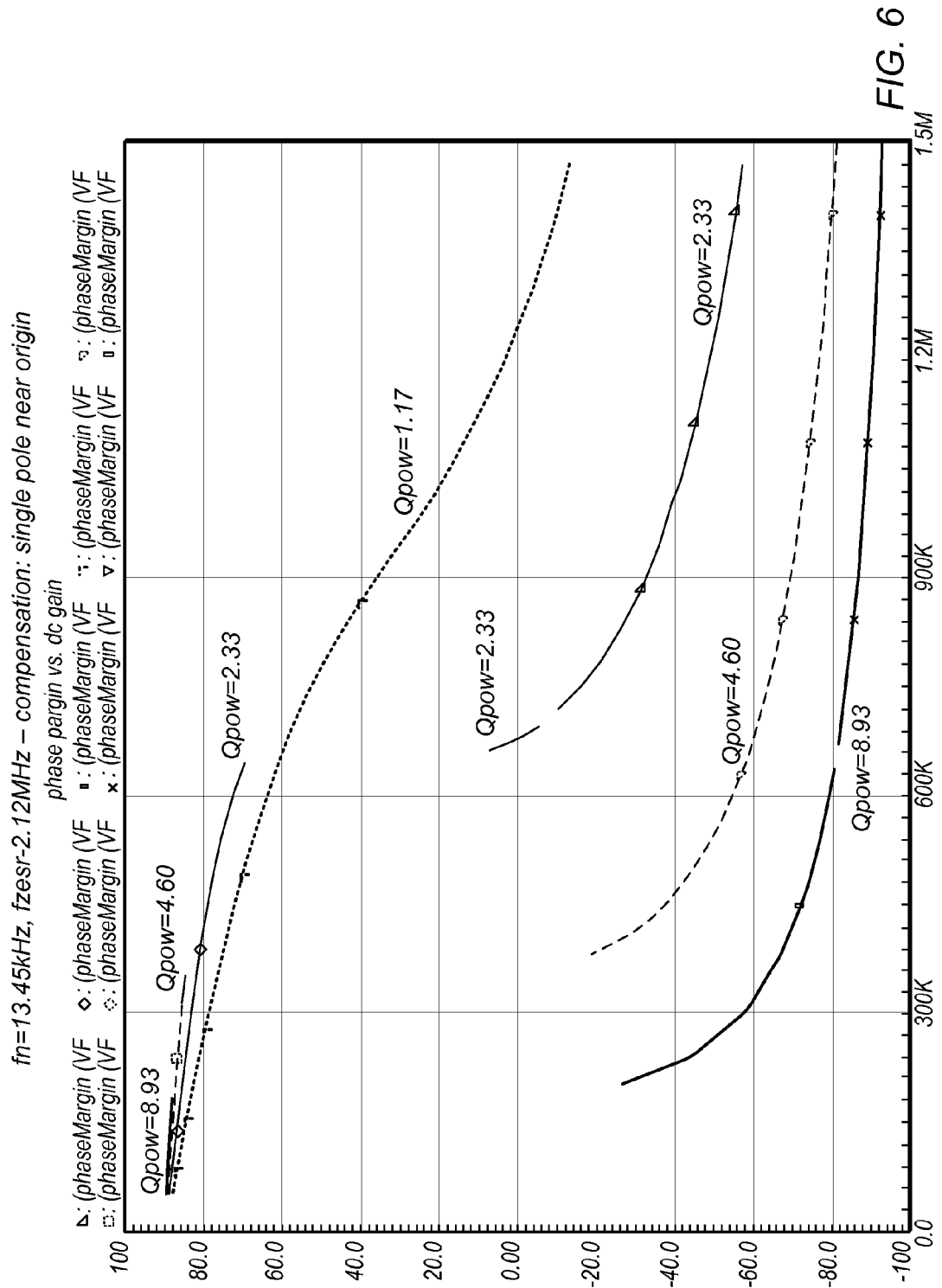
FIG. 6 shows function curves representing phase margin vs. DC loop gain (for $Q_{pow}$=1.17, 2.33, 4.60, 8.93), according to one embodiment.

FIG. 6 shows the phase margin of the loop as a function of the DC loop gain for different values of the power stage quality factor $Q_{pow}$ (in the example shown, $Q_{pow}$=1.17, 2.33, 4.60, 8.93). Low $Q_{pow}$ power plants (e.g. $Q_{pow}$=1.17) with a single 0 dB crossing frequency for the entire range of DC loop gain values (the unity-gain frequency is lower than the natural frequency $f_{n,pow}$) may exhibit a gradual transition of the phase margin from near 90° phase margin for low DC loop gain values, to negative values at high DC loop gain values. Higher $Q_{pow}$ power plants may exhibit a sharp transition from a near 90° phase margin to a negative phase margin at the DC loop gain value where the (falling) loop gain changes from a single 0 dB crossing frequency to two 0 dB crossing frequency values (the unity-gain frequency may exceed the natural frequency $f_{n,pow}$). As seen in FIG. 6, a sufficient phase margin may be achieved for a lower DC loop gain value for a higher $Q_{pow}$ power plant.

Figure 7:
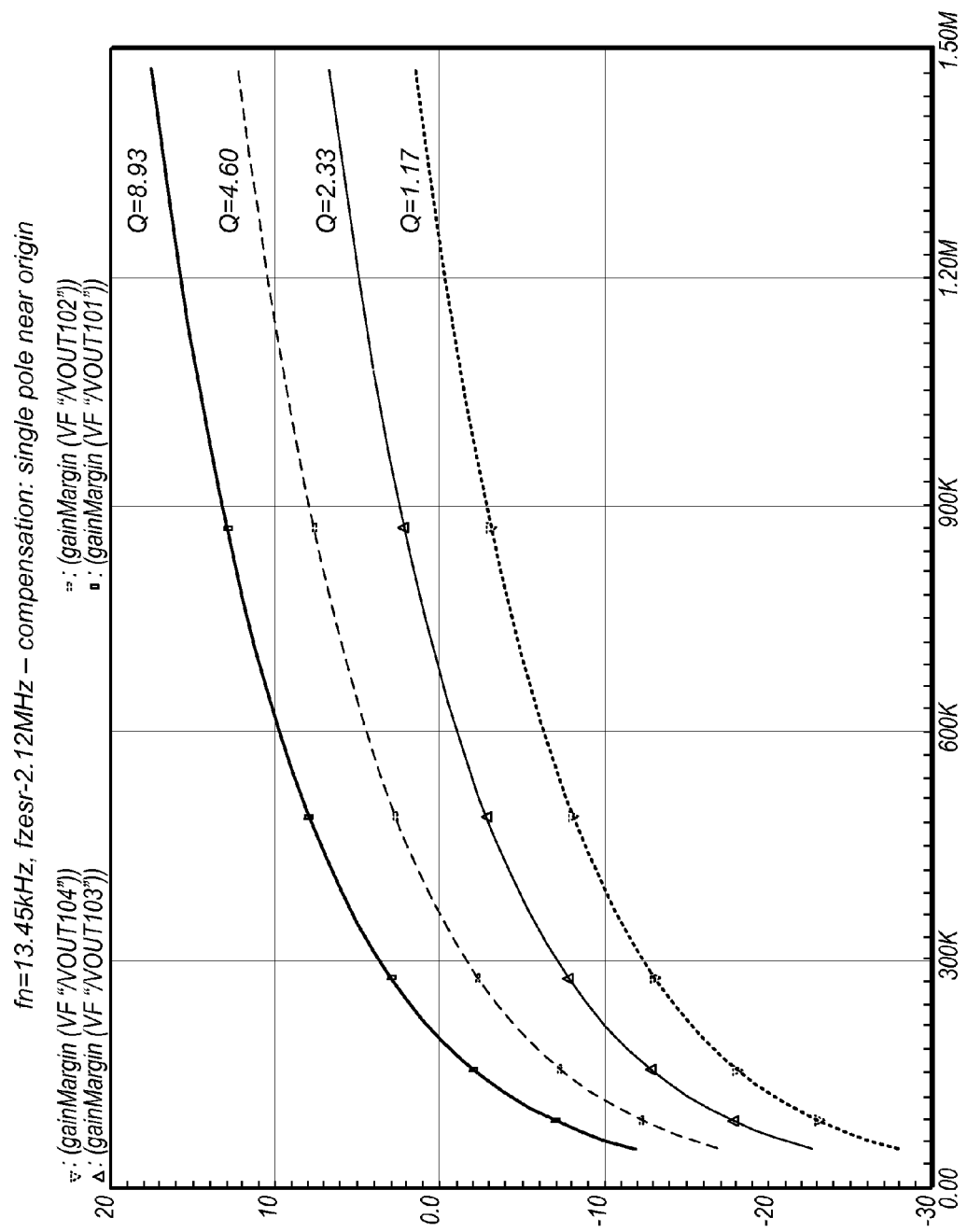
FIG. 7 shows function curves representing gain margin vs. DC loop gain (for $Q_{pow}$=1.17, 2.33, 4.60, 8.93), according to one embodiment.

FIG. 7 shows the gain margin of the loop as a function of the DC loop gain for different values of the power stage quality factor $Q_{pow}$ (in the example shown, $Q_{pow}$=1.17, 2.33, 4.60, 8.93). A lower DC loop gain value may improve the gain margin. Furthermore a higher $Q_{pow}$ power plant may require a lower DC loop gain value to achieve a sufficient gain margin for stable operation.

In summary, as observed in FIGS. 6 and 7, the loop may be stable with sufficient phase margin and gain margin for power stages with both low and high $Q_{pow}$ values, if a single compensation pole near origin and a sufficiently low DC loop gain value is chosen. Low DC loop gain values may also result in low unity-gain frequency. Then, the performance of the loop may be marginal both in steady-state regulation and in load transient response. Therefore an initial compensation function that includes a pole near the origin and, a sufficiently low DC gain (the lowest possible DC gain that can be implemented in the controller) may ensure stable operation after power-up of the converter.

Second Step: Selection of Value of Dc Loop Gain (Compensation Coefficient k)

When the value of the DC loop gain is increased, both the loop phase margin and gain margin may eventually become insufficient as shown in FIGS. 6 and 7, resulting in an unstable system. For high quality factor $Q_{pow}$ values of the power plant, a sharp transition from stability to instability may take place. Then, a small percentage change in the DC loop gain may result in a change of the phase margin from a near 90° value to a negative value. By monitoring the ripple (i.e. the peak to peak deviation) at the output voltage, it may be possible to detect when the phase margin is reduced and the loop is in a near-instability region. The steady-state switching ripple amplitude may be measured for $k=k_{init}$, at which the system is understood to be stable. During the search steps of the algorithm, an upper limit may be set for what is considered an acceptable ripple at the output (caused by switching or instability, for example). In one set of embodiments, the upper limit may be specified to equal the switching ripple increased by a small percentage. The exact value of the upper limit may not be important so long as the steady-state ripple at the end of the search meets the requirements. Thus, the DC gain would be increased until the ripple at the output voltage crossed a pre-determined threshold. As used herein, $k_{phase}$ denotes the gain k value where the phase margin exhibits a sharp transition. This value may be used as a reference point in subsequent steps of the auto-compensation method. Table 1 shows the values of the DC loop gain where the gain margin is 0 dB, −3 dB, −6 dB and the phase exhibits a sharp transition from positive to negative values.

TABLE 1

| $Q_{pow}$ | DC Gain @ Gain Margin = 0 dB | DC Gain @ Gain Margin = −3 dB | DC Gain @ Gain Margin = −6 dB | DC Gain @ Sharp Phase Margin Transition |
|---|---|---|---|---|
| 8.93 | DC gain = 195.3K | DC gain = 137.7K | DC gain = 97.29K | DC gain = 190K |
| 4.60 | DC gain = 372.2K | DC gain = 262.8K | DC gain = 185.8K | DC gain = 360K |
| 2.33 | DC gain = 728.7K | DC gain = 515.7K | DC gain = 363.1K | DC gain = 660K |
| 1.17 | DC gain = 1.454M | DC gain = 1.025M | DC gain = 726.2K | N/A |

In other words, the second step of the auto-compensation may include increasing the initial DC loop gain value $k_{init}$ of the compensation coefficient k, until the output ripple increases above a pre-determined threshold, indicating that the system is entering a near-instability region due to insufficient phase margin and/or gain margin. The value of the compensation coefficient k at the end of this step of the auto-compensation method may be close to $k_{phase}$ for power plants with high quality factor $Q_{pow}$, with $k_{phase}$ being the DC gain value where the phase margin exhibits a sharp transition. As will be further shown below, the auto-compensation method may not be sensitive to the exact value of the DC loop gain selected in this step.

Figure 8:
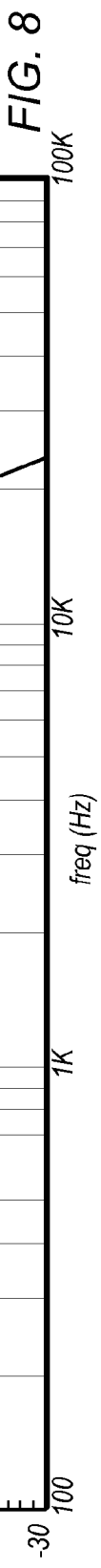
FIG. 8 shows a Bode plot of loop gain—$Q_{pow}$=8.93, DC gain=190K, according to one embodiment.
Figure 9:
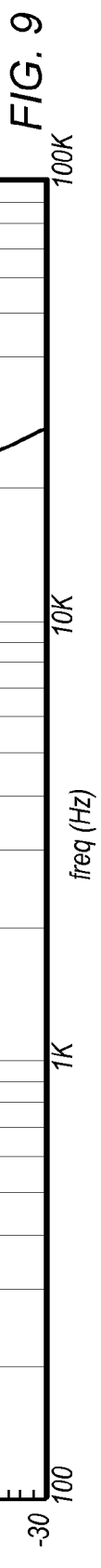
FIG. 9 shows a Bode plot of loop gain—$Q_{pow}$=4.60, DC gain=360K, according to one embodiment.
Figure 10:
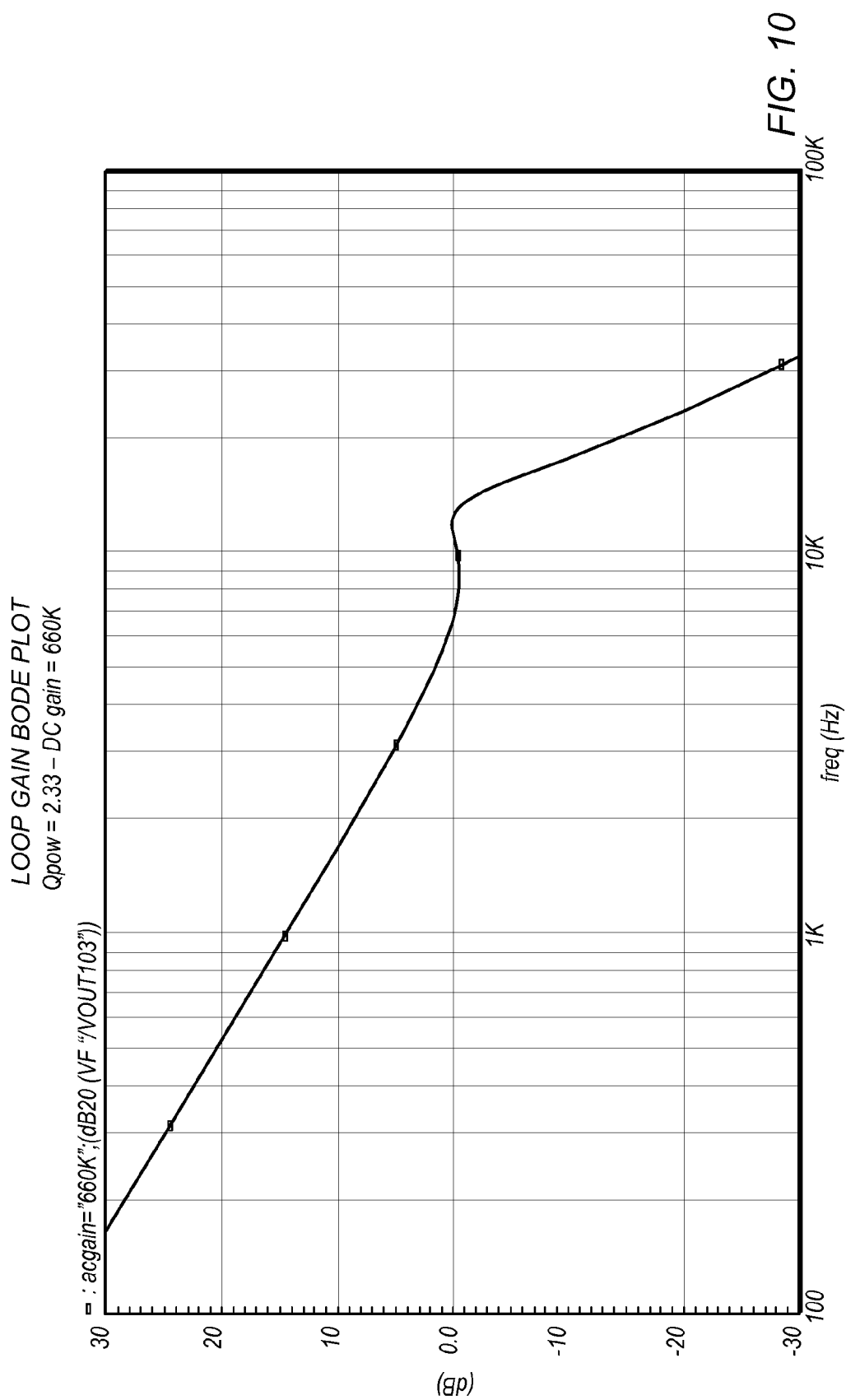
FIG. 10 shows a Bode plot of loop gain—$Q_{pow}$=2.33, DC gain=660K, according to one embodiment.

FIGS. 8, 9 and 10 show the Bode plot of the loop gain of the power plant with different quality factors $Q_{pow}$ of 8.93, 4.60 and 2.33 respectively. The DC gain value may be chosen to equal $k_{phase}$ which is the DC gain value selected during the second step of the auto-compensation method. As seen, the resonant peak in all three figures is approximately at the 0 dB level. Therefore, the unity-gain frequency of the loop gain may approximately equal the natural frequency $f_{n,pow}$ of the power plant at the end of the second step of the auto-compensation method. Thus, the second step may primarily revolve around modifying k to achieve greater accuracy (higher gain) and speed (higher unity gain frequency). As derived from the loop gain function, it becomes apparent that increasing k to $k_{phase}=2*\pi*f_{n,pow}/(Q_{pow}*k_1)$ would result in a unity-gain frequency ($f_{ug}$) $f_{ug}=f_{n,pow}$ and zero gain margin at $f=f_{n,pow}$. Therefore, increasing the value of k from $k_{init}$ to a value approaching $k_{phase}$ would result in an unstable regulation loop. Accordingly, setting limits on the duty cycle will ensure that the "ripple" amplitude does not get out of control. These limits may be set around the duty cycle value measured in step 1 ($k=k_{init}$). Table 2 shows the unity-gain frequency that may be derived from FIGS. 8, 9 and 10.

TABLE 2

| $Q_{pow}$ | $f_{n,pow}$ | DC gain | Unity-Gain Frequency |
|---|---|---|---|
| 8.93 | 13.45 kHz | 190K | 13.34 kHz |
| 4.60 | 13.45 kHz | 360K | 13.14 kHz |
| 2.33 | 13.45 kHz | 660K | 12.08 kHz |

Third Step: Selection of the Respective Values of Compensation Coefficients $F_{n,comp}$, $Q_{comp}$ In this step, two zeroes may be added in the compensation function to improve the performance of the regulation loop by increasing the loop bandwidth. The compensation function may again take the form of equation 3:

$$g_{comp}(s)=k*[1+s/(2*\pi*f_{n,comp}*Q_{comp})+s^2/(2*\pi*f_{n,comp})^2]/s. \quad (3)$$

The total loop gain may then be given by:

$$g_{loop}=k*k_1*g_{PS}(s)*[1+s/(2*\pi*f_{n,comp}*Q_{comp})+s^2/(2*\pi*f_{n,comp})^2]/s, \quad (7)$$

where $g_{PS}(s)$ is given by Eq. 1, $k \cong k_{phase}$ for high $Q_{pow}$ values, and $k_1$ denotes the gain of the regulation loop contributed by other functions such as the pulse-width modulator (e.g. PWM block 104 of FIG. 1) and the error amplifier (e.g. error amplifier 116 of FIG. 1). In this step of the auto-compensation function, the values of $f_{n,comp}$ and $Q_{comp}$ appearing in Eq. 3 may be selected.

Initially a high $f_{n,comp}$ value may be chosen to ensure that $f_{n,comp} >> f_{n,pow}$ for any practical power plant component values. In one set of embodiments, when selecting the initial value of $f_{n,comp}$ it may be assumed that the power plant $f_{n,pow}$ complies with design guidelines set forth by performance expectations and limitations of the controller, e.g., there exists a known upper bound for $f_{n,pow}$ beyond which stable operation is not possible for a given controller. In other words, while knowledge of the power plant is not required, assumptions about the power plant may be made based on knowledge of the controller, based on well understood principles of interoperability of the controller with potential (expected) power plants. For example, in one embodiment, the upper bound of $f_{n,pow}$ for digital controllers may be identified in terms of the switching frequency of the controller, as will be further shown below, expressed in equation 13. A high $Q_{pow}$ power plant (e.g. $Q_{pow}$=8.93) is used herein as an example. Two DC loop gain values may be considered for this power plant. One (DC gain=230K) may be 20% higher and the other one (DC gain=150K) may be 20% lower than the DC loop gain value selected in step 2 ($k=k_{phase}$). As will be shown below, the auto-compensation method may not be sensitive to the exact value of the DC loop gain selected in step 2.

Figure 11:
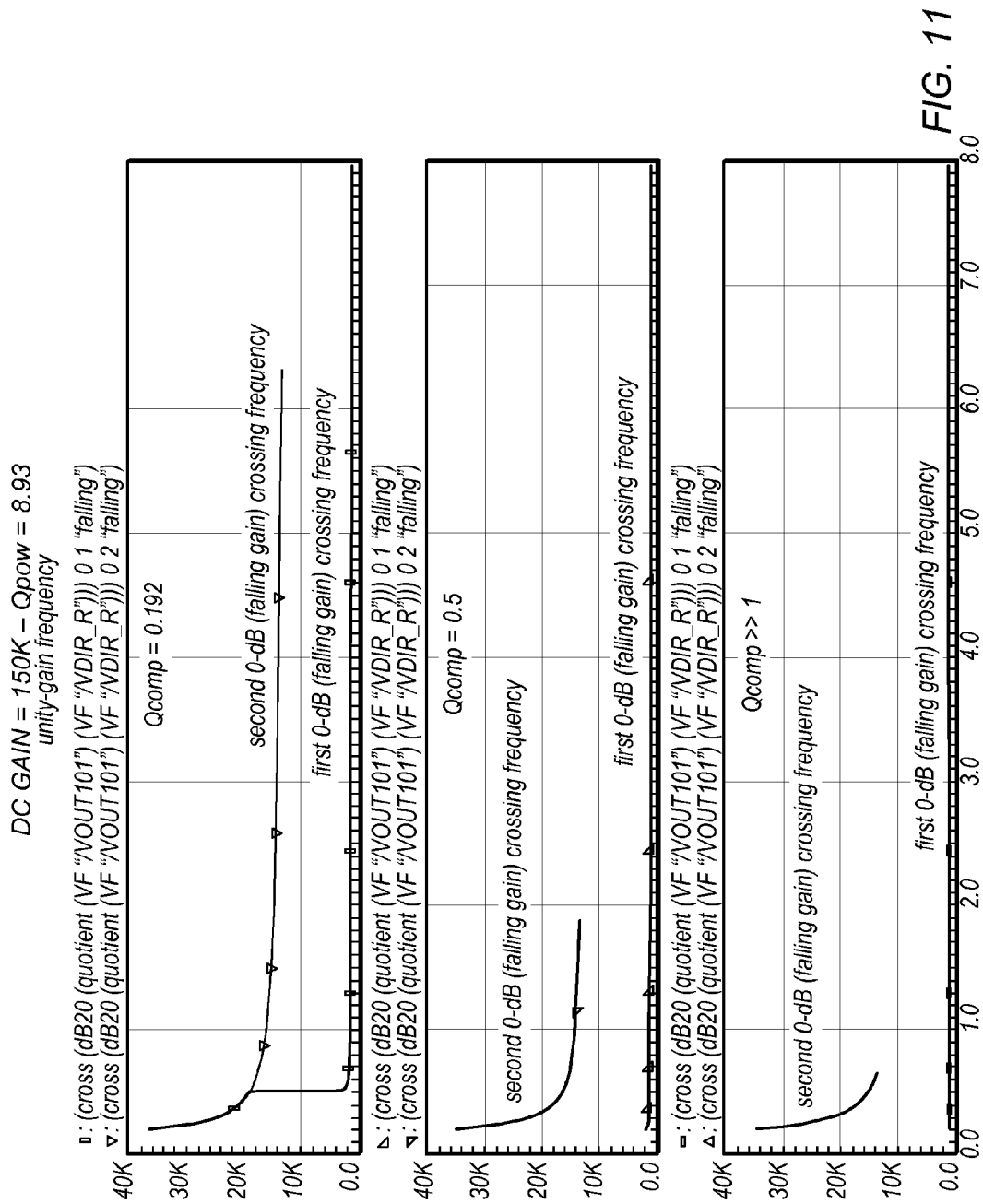
FIG. 11 shows function curves representing unity-gain frequency vs. ratio=$f_{n,comp}/f_{n,pow}$ for DC loop gain of 150K—$f_{n,pow}$=13.45 kHz, $Q_{pow}$=8.93, $\zeta_{comp}$1/[2*$Q_{comp}$]=0, 1, 2.6, according to one embodiment.
Figure 12:
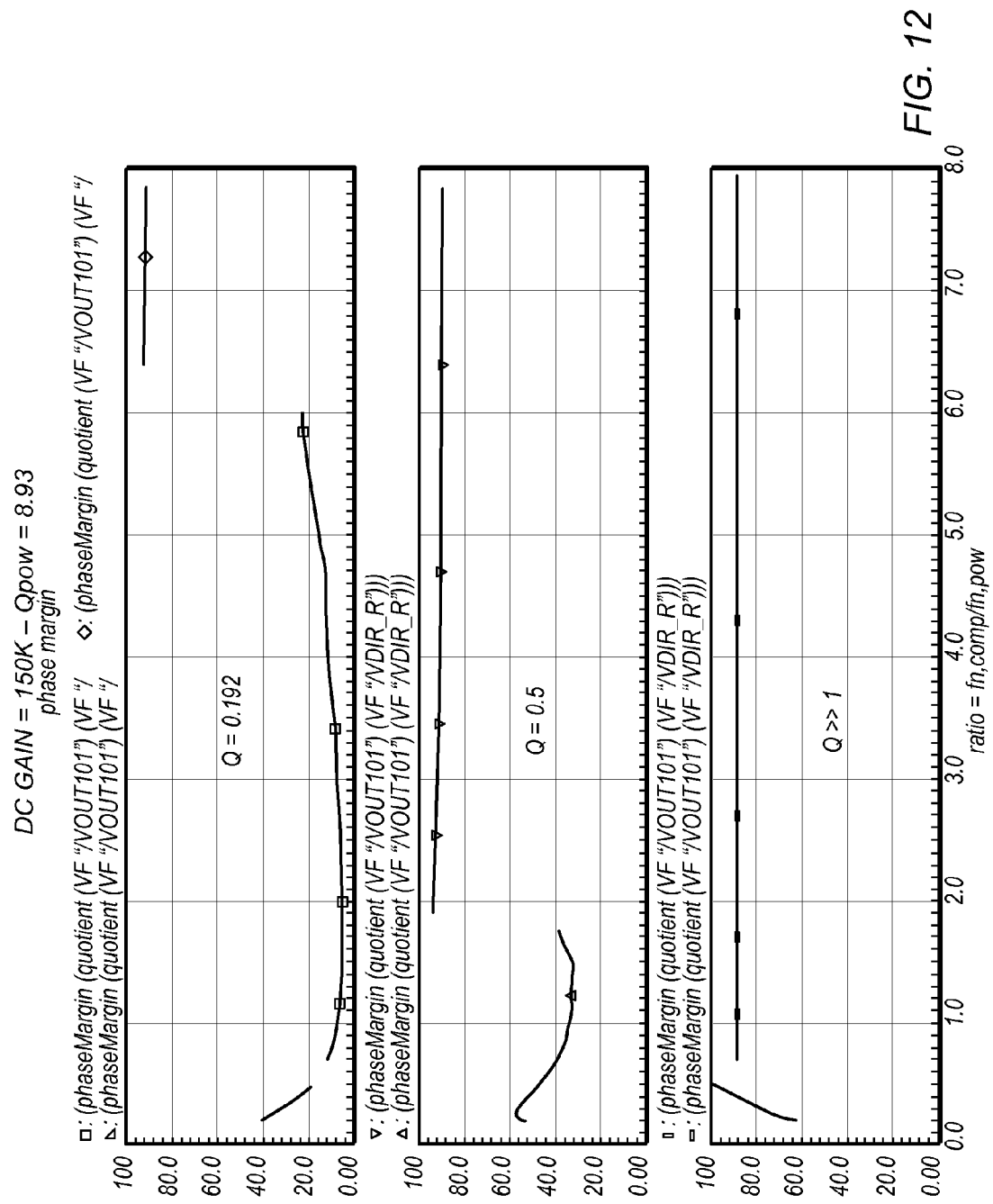
FIG. 12 shows function curves representing phase margin vs. ratio=$f_{n,comp}/f_{n,pow}$ for DC loop gain of 150K—$f_{n,pow}$=13.45 kHz, $Q_{pow}$=8.93, $\zeta_{comp}$=1/[2*$Q_{comp}$]=0, 1, 2.6, according to one embodiment.
Figure 13:
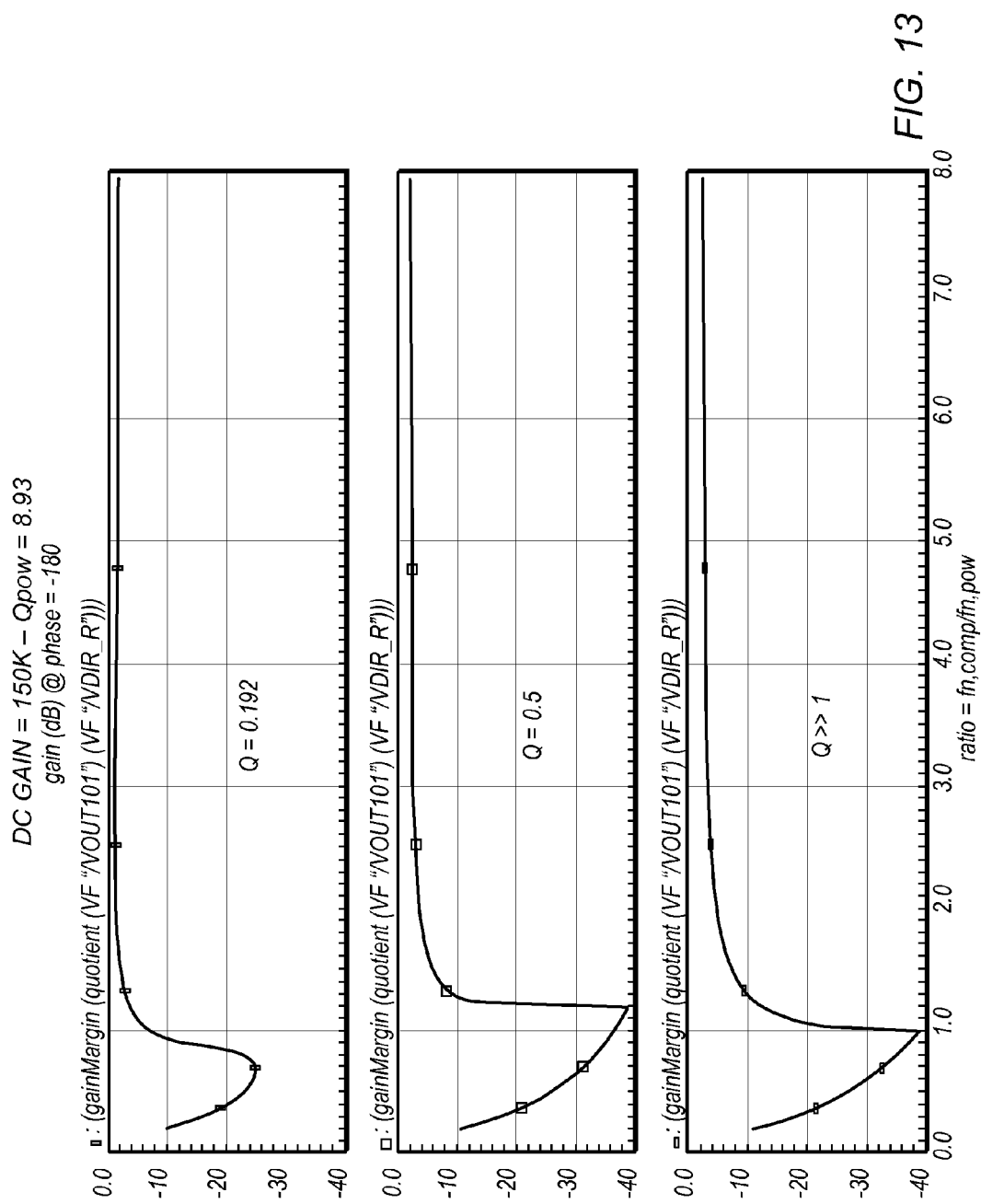
FIG. 13 shows function curves representing gain margin vs. ratio=$f_{n,comp}/f_{n,pow}$ for DC loop gain of 150K—$f_{n,pow}$=13.45 kHz, $Q_{pow}$=8.93, $\zeta_{comp}$=1/[2*$Q_{comp}$]=0, 1, 2.6, according to one embodiment.
Figure 14:
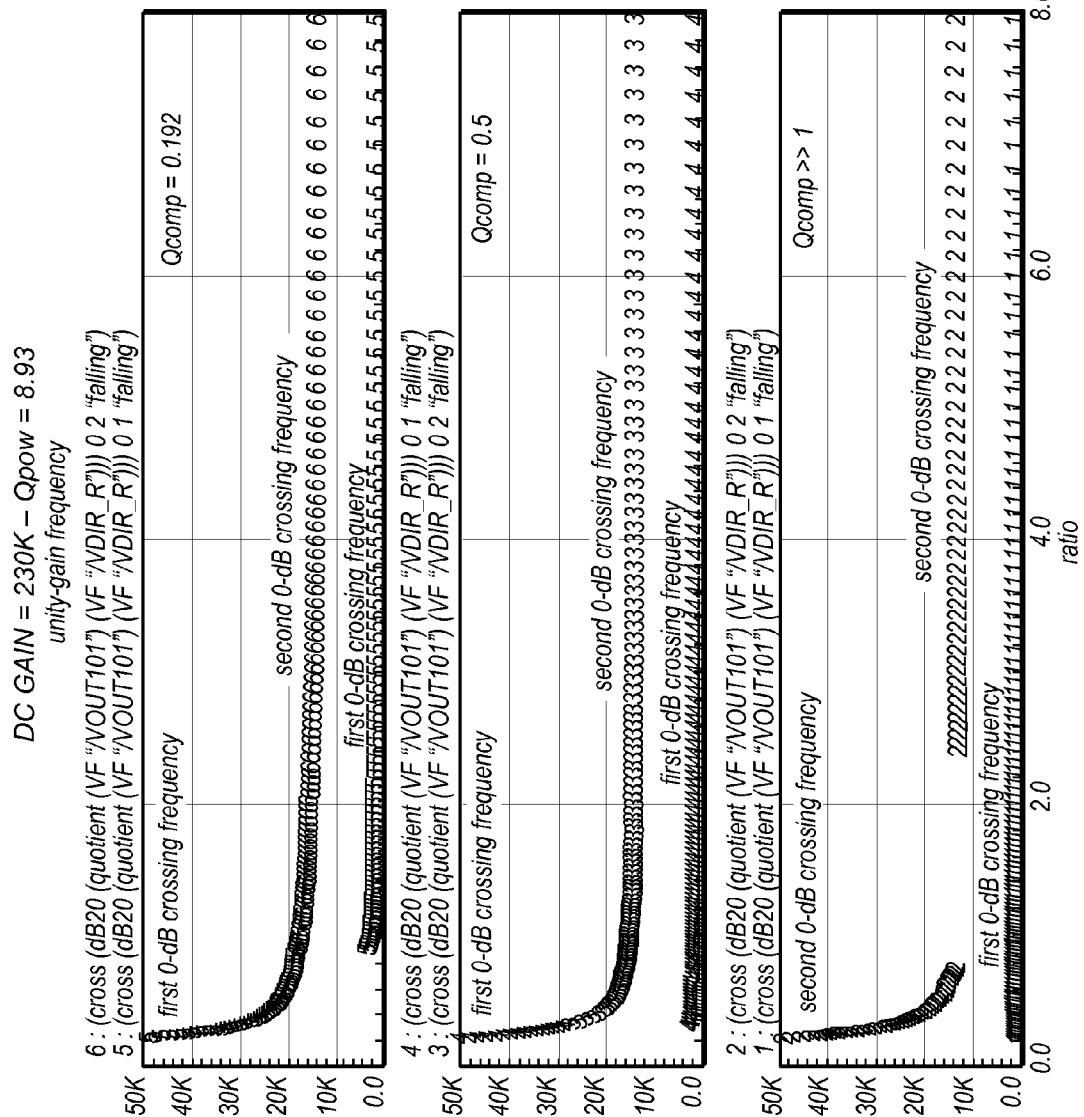
FIG. 14 shows function curves representing unity-gain frequency vs. ratio=$f_{n,comp}/f_{n,pow}$ for DC loop gain of 230K—$f_{n,pow}$=13.45 kHz, $Q_{pow}$=8.93, $\zeta_{comp}$=1/[2*$Q_{comp}$]=0, 1, 2.6, according to one embodiment.
Figure 15:
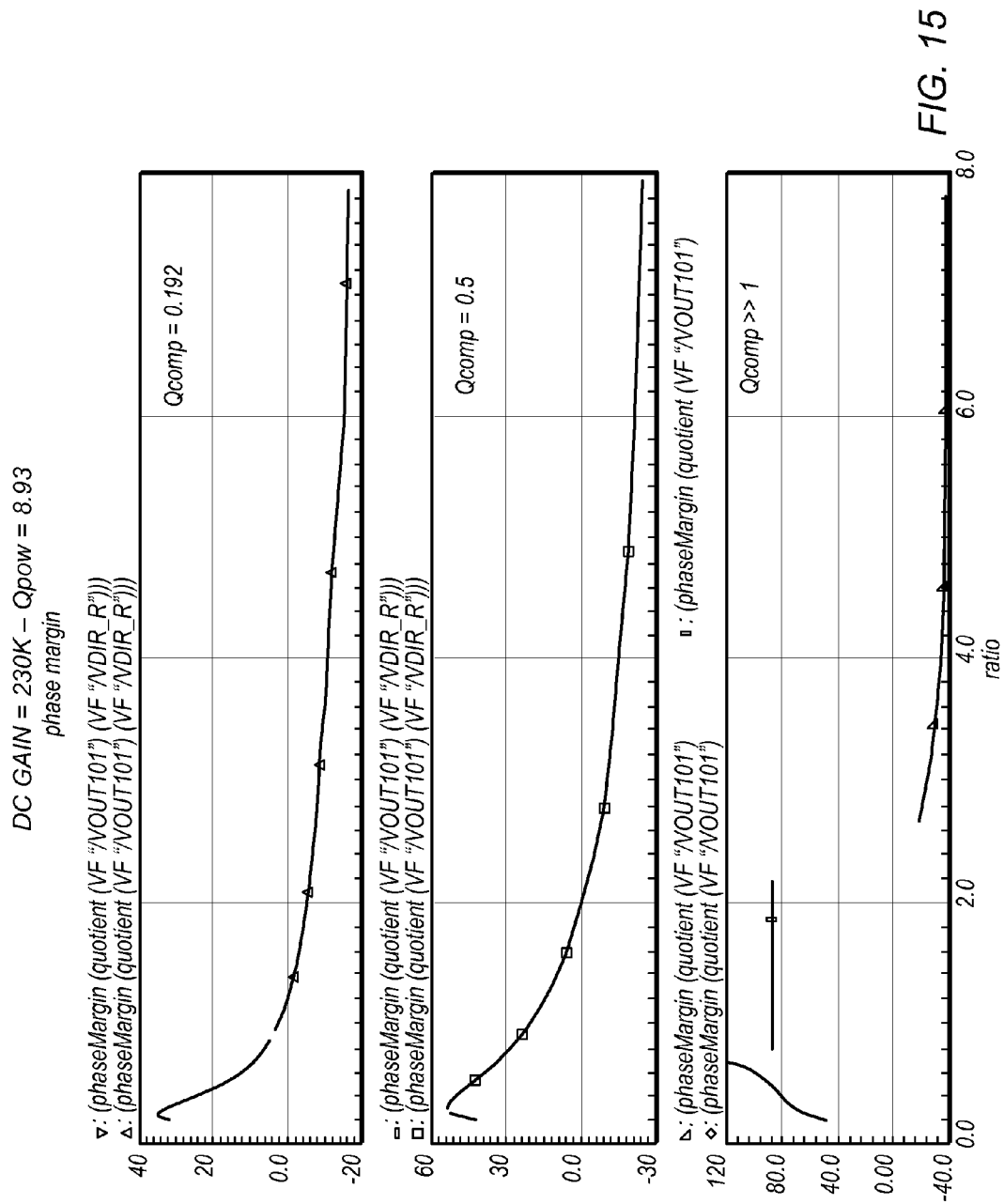
FIG. 15 shows function curves representing phase margin vs. ratio=$f_{n,comp}/f_{n,pow}$ for DC loop gain of 230K—$f_{n,pow}$=13.45 kHz, $Q_{pow}$=8.93, $\zeta_{comp}$=1/[2*$Q_{comp}$]=0, 1, 2.6, according to one embodiment.
Figure 16:
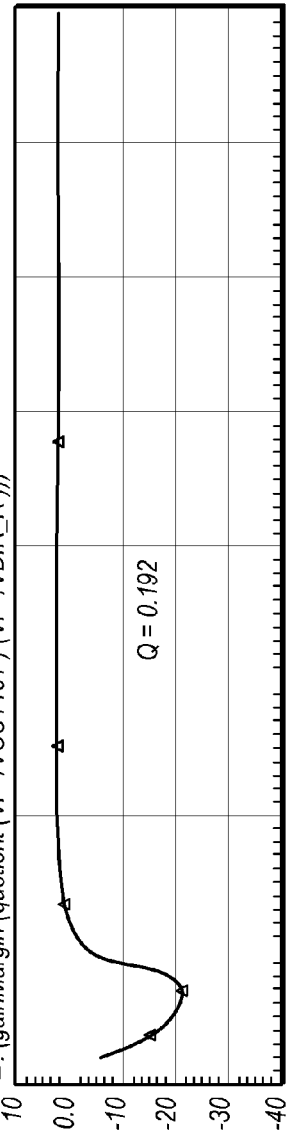
FIG. 16 shows function curves representing gain margin vs. ratio=$f_{n,comp}/f_{n,pow}$ for DC loop gain of 230K—$f_{n,pow}$=13.45 kHz, $Q_{pow}$=8.93, $\zeta_{comp}$=1/[2*$Q_{comp}$]=0, 1, 2.6, according to one embodiment.
Figure 16:
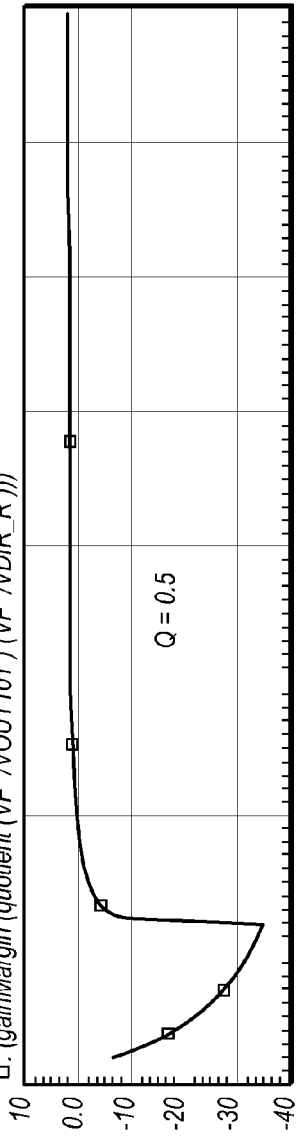
Figure 16:
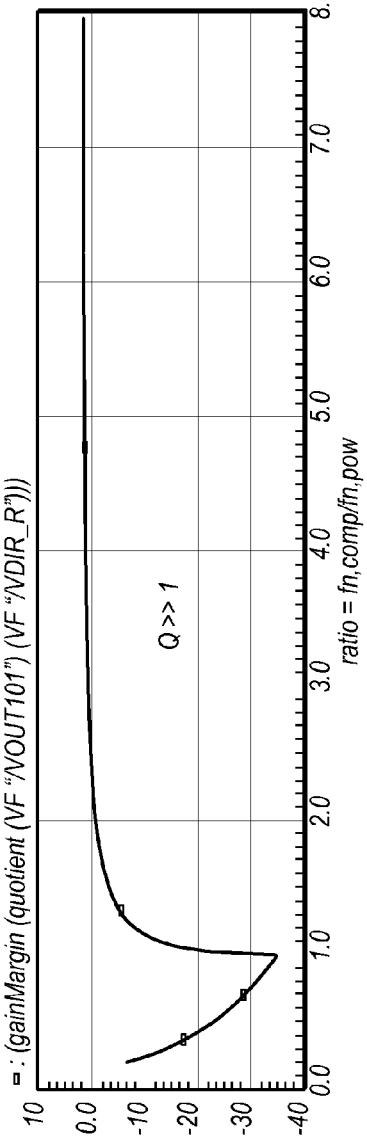

The $f_{n,comp}$ compensation coefficient may be repeatedly decreased from a high value to a low value while keeping the $Q_{comp}$ compensation coefficient constant. FIGS. 11, 12 and 13 show respectively the unity-gain frequency, phase margin and gain margin as a function of the ratio $f_{n,comp}/f_{n,pow}$ for a DC loop gain value of 150K, for three different values of $Q_{comp}$ (in this example, $Q_{comp}$=0.192, 0.5, and greater than 1). Similarly, FIGS. 14, 15 and 16 show the unity-gain frequency, phase margin and gain margin for DC loop gain equal to 230K.

For $f_{n,comp} \gg f_{n,pow}$, $Q_{comp} \gg 1$ and DC loop gain of 150K, the loop may exhibit a sufficient phase margin but a low gain margin. For $f_{n,comp} \gg f_{n,pow}$, $Q_{comp} \gg 1$ and DC loop gain of 230K both the phase margin and the gain margin may be insufficient. By reducing the value of $f_{n,comp}$ (or equivalently the value of ratio=$f_{n,comp}/f_{n,pow}$) to reach approximately the value of $Q_{pow}$ while keeping $Q_{comp} \gg 1$, sufficient phase margin and gain margin may be obtained for both the DC loop gain values. Thus the increased ripple at the voltage output observed at the end of step 2 (where the DC loop gain was selected) may be reduced below a limit defining the maximum acceptable output ripple. In other words, by measuring the switching ripple amplitude of the output during the first step (outlined above), the system may be identified as being stable when the observed ripple at the output is in the vicinity of the measured steady-state switching ripple.

As the value of $f_{n,comp}$ is further reduced, the unity-gain frequency may keep increasing, while both the phase margin and the gain margin are beginning to get reduced. Therefore by continuing to reduce $f_{n,comp}$, the ripple may start increasing again. The increase of the output voltage ripple above a pre-determined limit may be used as a criterion to stop reducing the value of $f_{n,comp}$. The selected $f_{n,comp}$ value may also result in increased loop unity-gain frequency (higher than for the natural frequency $f_{n,pow}$ of the power plant).

As seen in FIGS. 11, 12, 13, 14, 15, and 16, for $Q_{comp} \gg 1$ ($\zeta_{comp} \cong 0$), the search method for selecting $f_{n,comp}$ described above may be successful for both DC gain values (150K and 230K). Therefore the method may not be sensitive to the exact value of the DC loop gain selected in step 2. It should be noted that using a low $Q_{comp}$ value may not be an appropriate choice for the search to determine the value of $f_{n,comp}$. The curves of phase margin and gain margin as a function of the ratio $f_{n,comp}/f_{n,pow}$ for low $Q_{comp}$ values shown in FIGS. 12, 13, 15, and 16 indicate the described search method (consisting in sweeping $f_{n,comp}$ from a high value to a low value and monitoring the voltage ripple at the output) may not be easily applied for the purpose of selecting an $f_{n,comp}$ value resulting in increased loop unity-gain frequency and sufficient phase margin and gain margin. Therefore in this step of the auto-compensation method, $Q_{comp}$ may be adjusted such that $Q_{comp} \gg 1$ ($\zeta_{comp} \cong 0$).

In summary, a third step of the auto-compensation method (selection of $f_{n,comp}$ value) may include selecting a high enough value of $f_{n,comp}$ such that $f_{n,comp} f_{n,pow} \gg 1$, (as described above, and will be further described below with reference to equation 13), to ensure that the initial value of the two zeroes added to the compensation function is much higher than the natural frequency $f_{n,pow}$ of the power plant, while keeping $\zeta_{comp} \cong 0$. The third step may further include decreasing the initial high value of $f_{n,comp}$ to achieve satisfactory loop phase margin and gain margin to reduce the increased output voltage ripple below a predetermined value. Further decreasing the value of $f_{n,comp}$ at this stage in order to increase the unity gain frequency may result in the ripple of the output voltage again increasing above the predetermined threshold due to reduced phase margin and/or gain margin, at which point the value of $f_{n,comp}$ may again be slightly increased to bring the output voltage below the predetermined threshold value.

Conclusion

Performing the above described steps may therefore result in obtaining all three coefficients (k, $f_{n,comp}$, $Q_{comp}$) in the compensation function given by:

$$g_{comp}(s) = k*[1 + s/(2*\pi*f_{n,comp}*Q_{comp}) + s^2/(2*\pi*f_{n,comp})^2]/s. \quad (3)$$

Various embodiments of the auto-compensation method may be realized according to a general knowledge and/or assumption about the structure of the power converter(s) and filters used therewith, but without requiring any knowledge of the specific power plant component values. Thus, various embodiments may be implemented according to certain assumptions made about the power plant, based on the desired operating (switching) frequency and/or controllers that will be used for compensating the power converter. The selected values of the compensation function coefficients may result in a stable regulation loop with sufficient phase margin and gain margin. Furthermore, they may result in the maximum unity gain frequency leading to a stable loop.

Application of Auto-Compensation Method to Low Q Power Plants

Figure 17:
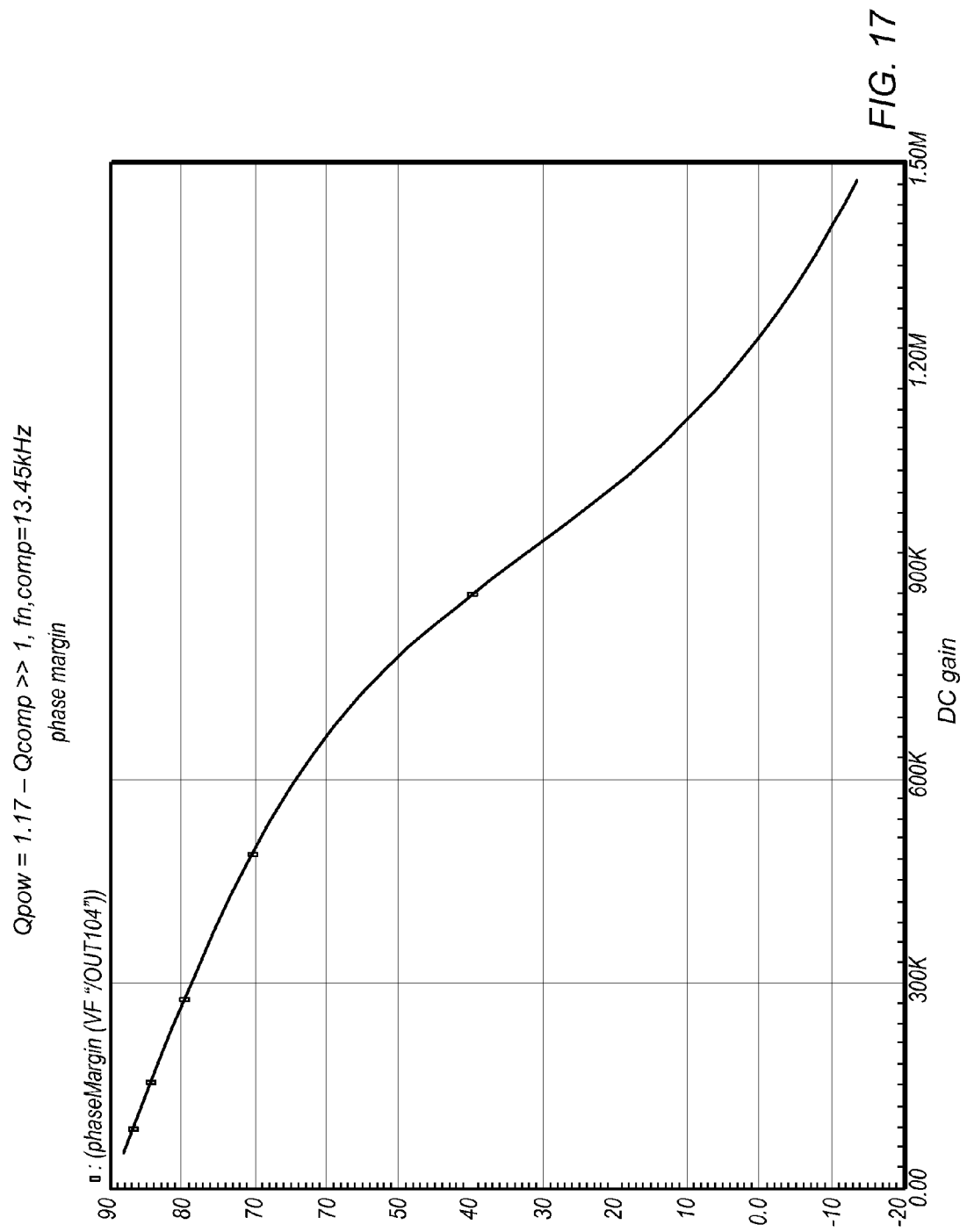
FIG. 17 shows a function curve representing phase margin vs. DC loop gain for power plant with $Q_{pow}$=1.17—single compensation pole near DC origin, according to one embodiment.
Figure 18:
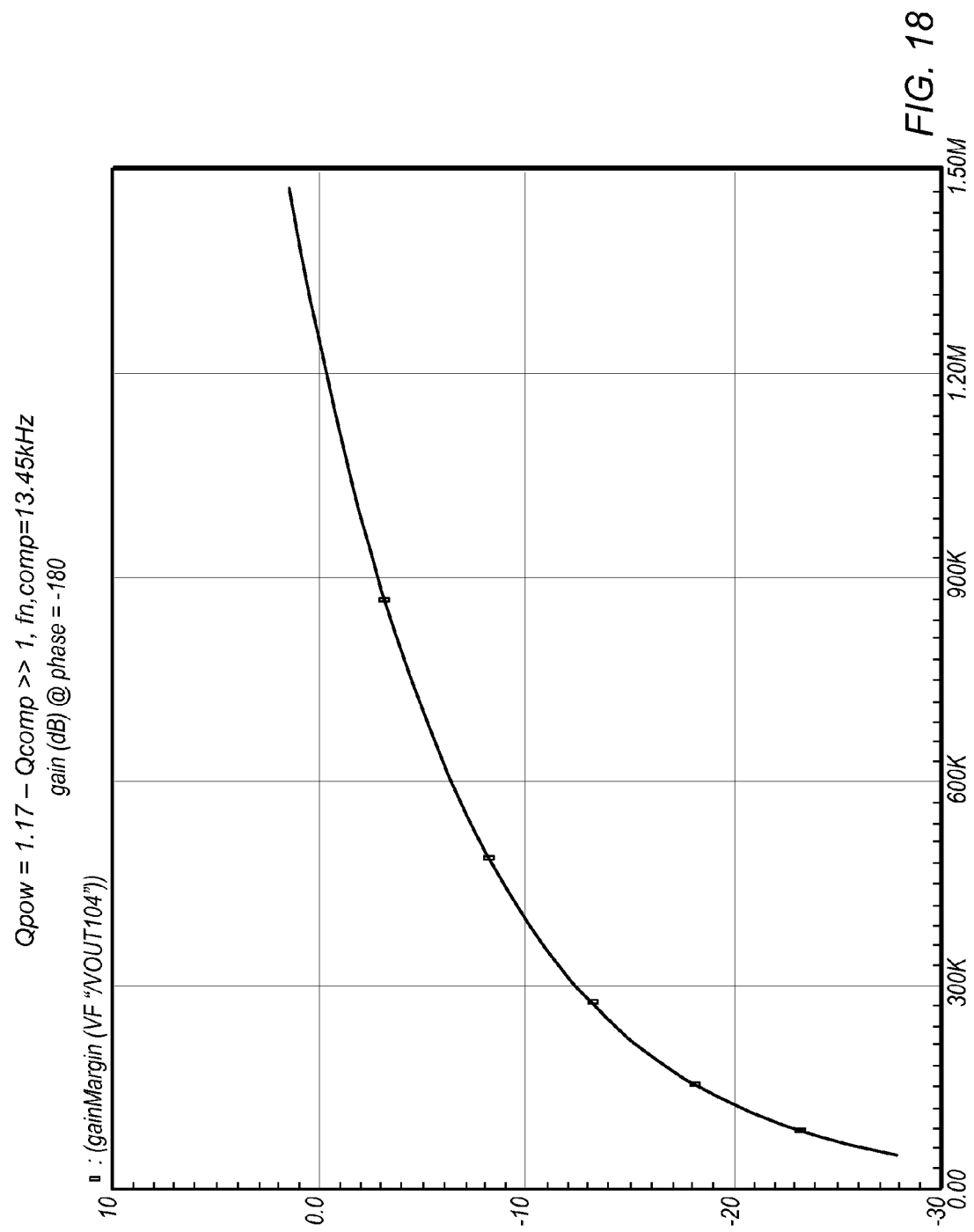
FIG. 18 shows a function curve representing gain margin vs. DC loop gain for power plant with $Q_{pow}$=1.17—single compensation pole near DC origin, according to one embodiment.

Various embodiments of the auto-compensation method may also be used in obtaining the coefficient values for low Q power plants. As previously noted, the value of the gain factor k may be selected in the second step of the auto-compensation method. For high quality factor $Q_{pow}$ power plants, the selected value of k may be well defined ($k \cong k_{pm=0}$) due to the sharp transition of the loop phase margin as a function of loop DC gain. The exact value of the threshold used to determine the presence of excessive output ripple may have little impact on the selected value of k. FIG. 17 shows the phase margin as a function of the loop DC gain (which is proportional to k) for a power plant with low quality factor $Q_{pow}$ power plant (in this example, $Q_{pow}$=1.17). FIG. 18 shows the gain margin as a function of the loop DC gain. The compensation may include a single pole near the DC origin. The transition of the phase margin from negative values (resulting in an unstable loop) to a sufficiently positive phase margin (resulting in a stable loop) may be gradual. The transition of the gain margin curve may also be gradual. Therefore, the chosen value of the threshold that determines excessive output voltage ripple may affect the selected value of the gain factor k.

Figure 19:
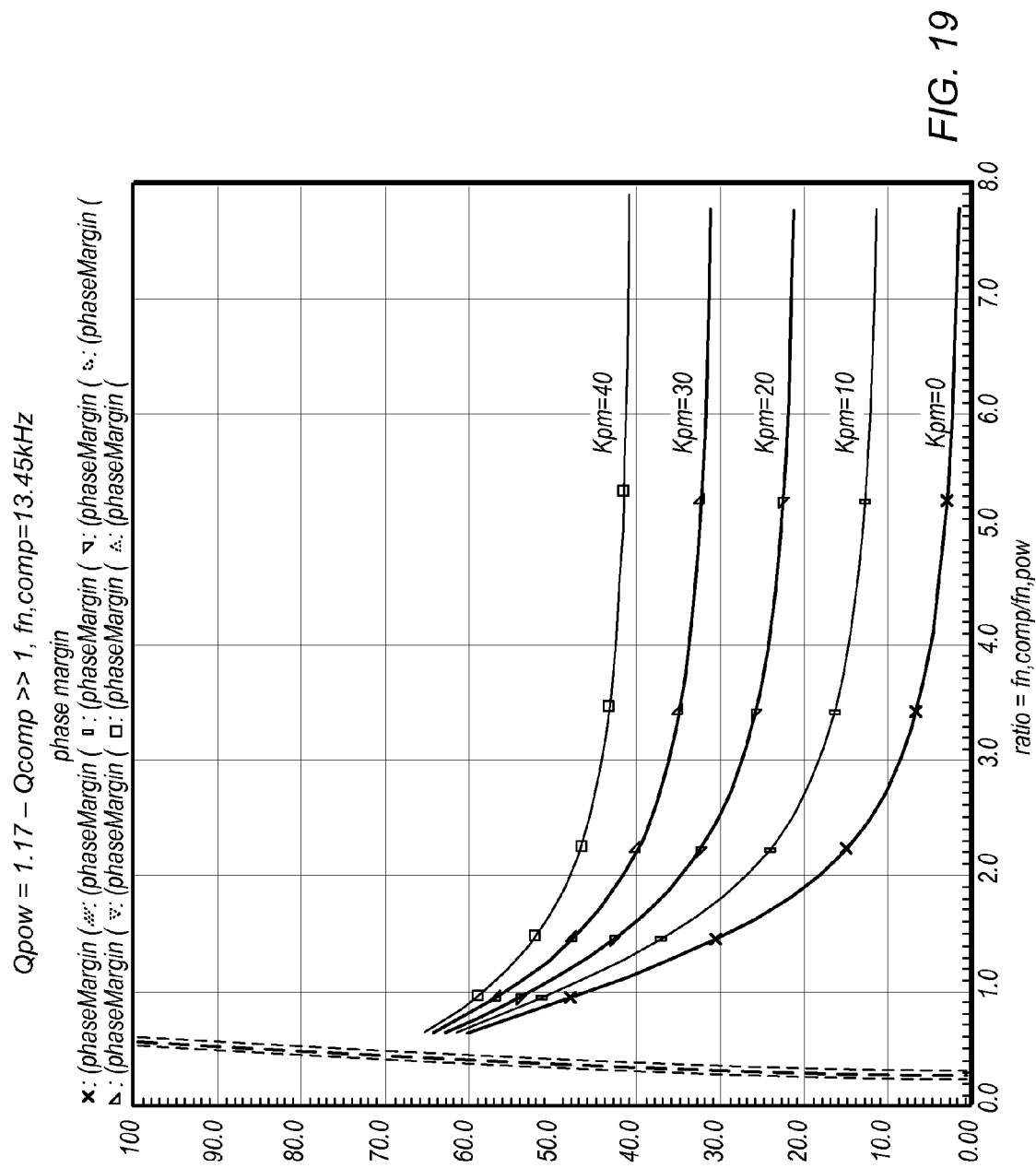
FIG. 19 shows function curves representing phase margin vs. ratio=$f_{n,comp}/f_{n,pow}$ for different values of the gain factor k (k=$k_{pm=0}$, $k_{pm=10}$, $k_{pm=20}$, $k_{pm=30}$, $k_{pm=40}$)—$Q_{pow}$=1.17, $Q_{comp}$>>1, according to one embodiment.
Figure 20:
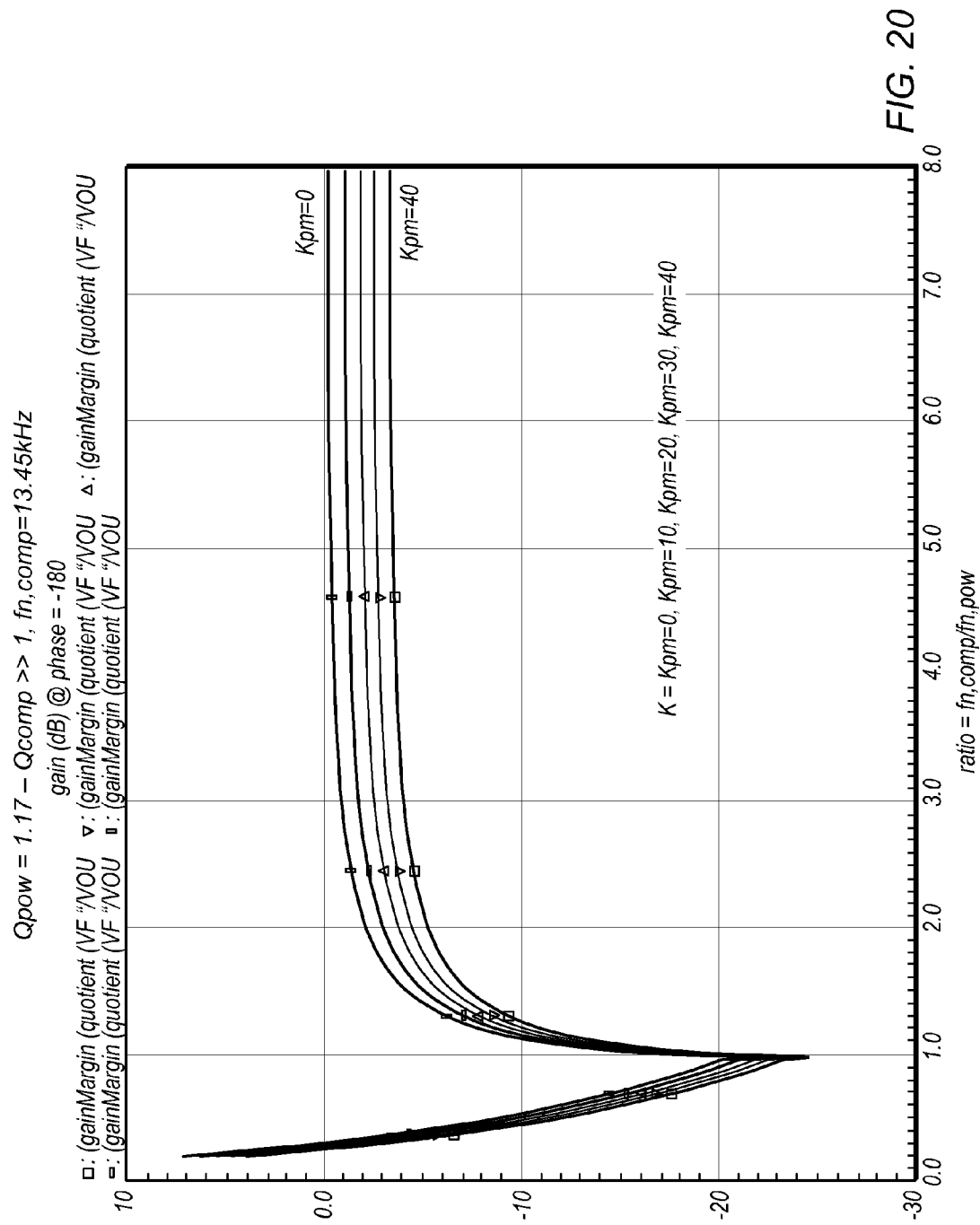
FIG. 20 shows function curves representing gain margin vs. ratio=$f_{n,comp}/f_{n,pow}$ for different values of the gain factor k (k=$k_{pm=0}$, $k_{pm=10}$, $k_{pm=20}$, $k_{pm=30}$, $k_{pm=40}$)—$Q_{pow}$=1.17, $Q_{comp}$>>1, according to one embodiment.
Figure 21:
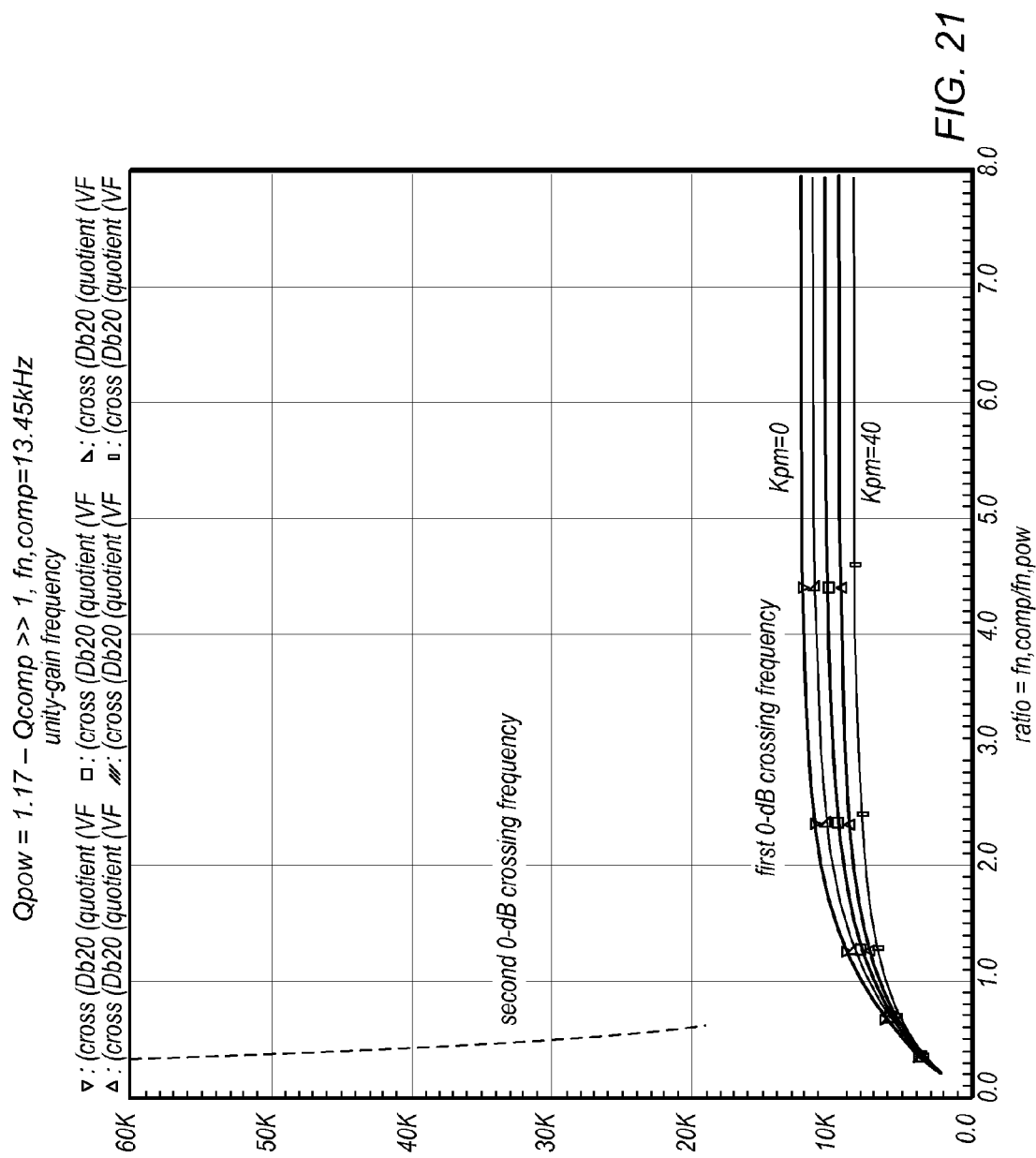
FIG. 21 shows function curves representing unity-gain frequency vs. ratio=$f_{n,comp}/f_{n,pow}$ for different values of the gain factor k (k=$k_{pm=0}$, $k_{pm=10}$, $k_{pm=20}$, $k_{pm=30}$, $k_{pm=40}$)—$Q_{pow}$=1.17, $Q_{comp}$>>1, according to one embodiment.

The auto-compensation method may work properly for a wide range of values of the gain factor k (selected in step 2). FIGS. 19 and 20 show respectively the phase margin and unity gain frequency as a function of ratio=$f_{n,comp}/f_{n,pow}$ (while keeping Qcomp$\gg$1) for different values of the gain factor k for the same power plant. Specifically $k_{pm=-10}$, $k_{pm=0}$, $k_{pm=10}$ and $k_{pm=20}$ ($k_{pm=0}/k_{pm=40} \cong 1.5$ for this specific power plant) denote respectively the values of the gain factor k that result in phase margin 0°, 10° 20°, 30° and 40° in FIG. 17. The auto-compensation method may operate to select for each of the four different values of k, a value of the ratio $f_{n,comp}/f_{n,pow}$ that is lower than 1. In step 3, the auto-compensation method may operate to keep decreasing the value of $f_{n,comp}/f_{n,pow}$ to improve phase margin and gain margin (FIGS. 19, 20) to reduce the output ripple that exists at the end of step 2. The method may further operate to keep decreasing the value of $f_{n,comp}/f_{n,pow}$ to improve the unity-gain frequency of the loop (FIG. 21). However the decreasing phase margin and gain margin (FIGS. 19, 20) may result in increased output voltage ripple. Accordingly, the search for selecting $f_{n,comp}/f_{n,pow}$ may be terminated when the output voltage ripple exceeds a previously determined threshold that corresponds to what may be considered an excessive ripple. It should be noted here that the threshold that has been previously determined (and used in the second step outlined above) may correspond to a minimum achievable ripple that would still yield a stable system. In some embodiments, however, two thresholds may be determined. A "quiet" threshold, corresponding to the ripple for stable, noise free operation, and a "noisy" threshold representing stable operation, albeit with a slight, low-level operation possibly present on the output voltage $V_{out}$. When using the "noisy" threshold, the search for $f_{n,comp}/f_{n,pow}$ may be terminated when the voltage ripple falls below the "noisy" threshold.

As seen in FIGS. 19, 20, and 21, a wide range of DC gain values may be selected in step 2 of the auto-compensation method, and a value for $f_{n,comp}/f_{n,pow}$ selected in step 3 may be less than 1, which may achieve a similar phase margin, gain margin and unity-gain frequency. Therefore, the auto-compensation method may not be sensitive to the exact DC gain value selected in step 2 for a low quality factor $Q_{pow}$ power plant.

Implementation of Auto-Compensation Method Using a Programmable Digital Controller The following is an example of how certain embodiments of the auto-compensation method may be implemented using a digital controller. The implementation of the analog (s-domain) compensation function:

$$g_{comp}(s)=k*[1+s/(2*\pi*f_{n,comp}*Q_{comp})+s^2/(2*\pi*f_{n,comp})^2]/s \quad (3)$$

may be given in the z-domain (digital implementation) by:

$$g_{comp}(z)=[A+B*z^{-1}+C*z^{-2}]/[1-z^{-1}]. \quad (8)$$

For the transfer curves described by Eq. (3) and (8) to achieve the same small signal behavior assuming complex compensation zeros, the following relationships may be established:

$$A=k/[1-2*r*\cos\theta+r^2], \quad (9a)$$

$$B=-A*2*r*\cos\theta, \quad (9b)$$

$$C=A*r^2, \quad (9c)$$

where $$r\equiv e^{-[\pi*fn,comp/(Qcomp*fsw)]}, \quad (10a)$$

$$\theta=[2*\pi*f_{n,comp}/f_{sw}]*sqrt[1-1/(4*Q_{comp}^2)]. \quad (10b)$$

It should be noted that in deriving Eqs. (10a) and (10b), the sampling frequency is assumed to be commensurate with the switching frequency $f_{sw}$. This holds when the duty-cycle of the power converter is updated once per switching cycle. A, B, and C may be considered compensation coefficients, which together determine a DC loop gain, and the respective positions of compensation zeros of a compensated power converter. Depending on the type of power regulator/controller used, more specifically, when using a power converter of a different type than the embodiments disclosed herein, A, B, and C together may in general determine the respective positions of compensation zeros, compensation poles, or both. Alternatively, the compensations coefficients may be established according to relationships that may slightly differ from those shown in Eqs. 9a through 9c, dependent on the type of power plant, controller, and filters. However, similar compensation coefficients may be defined and selected according to the criteria and considerations as disclosed herein, applied to different specific power plant, controller, and filter topologies.

From Eq. 9a, 9b and 9c, the following relationship may be derived:

$$A+B+C=k. \quad (11)$$

Choosing A=C may result in compensation zeros with $\zeta_{comp}=0$ (or equivalently $Q_{comp}=\infty$).

This may be derived as follows:

$$A=C \Rightarrow r^2=1 \Rightarrow Q_{comp}=\infty \Rightarrow \zeta_{comp}=1/(2*Q_{comp})=0.$$

Therefore $$A=C \Rightarrow Q_{comp}=\infty(\zeta_{comp}=0). \quad (12)$$

Furthermore if A=C ($Q_{comp}=\infty$) and B=0 then:

$$B=0 \Rightarrow \cos\theta=0 \Rightarrow \theta=\pi/2 \Rightarrow \pi/2=2*\pi*f_{n,comp}/f_{sw}]$$
$$\Rightarrow f_{n,comp}=f_{sw}/4.$$

Therefore $$(B=0)\&(A=C) \Rightarrow f_{n,comp}=f_{sw}/4, \quad (13)$$

which may ensure that $f_{n,comp} f_{sw}/4 >> f_{n,pow}$, since in practice it holds $f_{sw} >> f_{n,pow}$.

According to the auto-compensation method, the DC gain may be determined first, and the two compensation zero frequencies may be introduced afterwards. The initial value of the natural frequency $f_{n,comp}$ may be selected high to ensure that the compensation zeros have little impact on the loop gain stability and bandwidth. The implementation of the method may be simplified by including from the beginning the two zeroes positioned at high frequency, and then determining the DC gain factor "k". Two factors in the implementation of the auto-compensation method may significantly reduce the run time required for the method to execute. One factor may be the selection of both the loop gain (gain factor k) and the location of the compensation zero frequencies ($f_{n,comp}$, $\zeta_{comp}$) using one-dimensional searches. Another factor may be the simplicity of the required calculations, which may include mostly additions and subtractions.

Step 1—Initializing the Compensation Function Coefficients A, B and C

Initially $k=k_{init}$, $\zeta_{comp}=0$, $f_{n,comp}=f_{sw}/4$ ($f_{n,comp}=f_{sw}/4 >> f_{n,pow}$) may be set by initializing the compensation coefficients as follows:

$$A=C=k_{init}/2, B=0.$$

In one set of embodiments, a "quiet" threshold, or operating threshold may be determined for the regulated output voltage, as will be further discussed below. In addition, a 'noisy' output threshold may also be determined for use in the criterion for terminating the search when regulating the output at a fixed output voltage $V_{out}$. The average and peak-to-peak (ripple) values of the output waveform may be determined by measuring various state variables of the system, which may include a measurement of the output voltage itself (using multiple samples per switching cycle). The average value and ripple value may be defined as the 'quiet' steady state values. A 'noisy' output threshold $V_{p-p,noisy}$ may be defined at some percentage above the quiet steady state ripple $V_{p-p,ss}$, that is, $V_{p-p,noisy}=V_{p-p,ss}*(1+\epsilon)$.

Step 2—Determining the Loop Gain (Gain Factor k)

A and C (A=C=k/2) may be increased while keeping B=0, which may result in increasing the DC loop gain. After each gain increase, specified/selected state parameters may be measured, which may mean measuring the output voltage ripple, checking to see if the output voltage ripple exceeds $V_{noisy}$. If the threshold $V_{noisy}$ is exceeded, A and C may no longer be increased. $A_{gain}$, $C_{gain}$ ($A_{gain}=C_{gain}$) are used to denote the values of the coefficients A and C, respectively, at the end of the search.

Step 3—Determining the Natural Frequency $F_{n,comp}$ of Compensation Zeros with Damping Factor $\zeta_{comp}=0$ The absolute value of B (i.e. |B|, for B<0) may be increased while holding $A+B+C=A_{gain}+C_{gain}$ (constant) and A=C (that is, $A=C=[A_{gain}+C_{gain}-B]/2$). This may result in keeping the loop gain constant, reducing the natural frequency $f_{n,comp}$ and keeping $\zeta_{comp}=0$. As $f_{n,comp}$ approaches the natural frequency of the power plant $f_{n,pow}$, the ripple may be reduced below $V_{p-p,noisy}$. While increasing the absolute value of B, $f_{n,comp}$ may eventually start falling below $f_{n,pow}$, which may result in increased ripple exceeding $V_{p-p,noisy}$. At that point |B| may be slightly reduced to bring the output ripple back below the $V_{p-p,noisy}$ level.

General Auto-Compensation Algorithm

Figure 22:
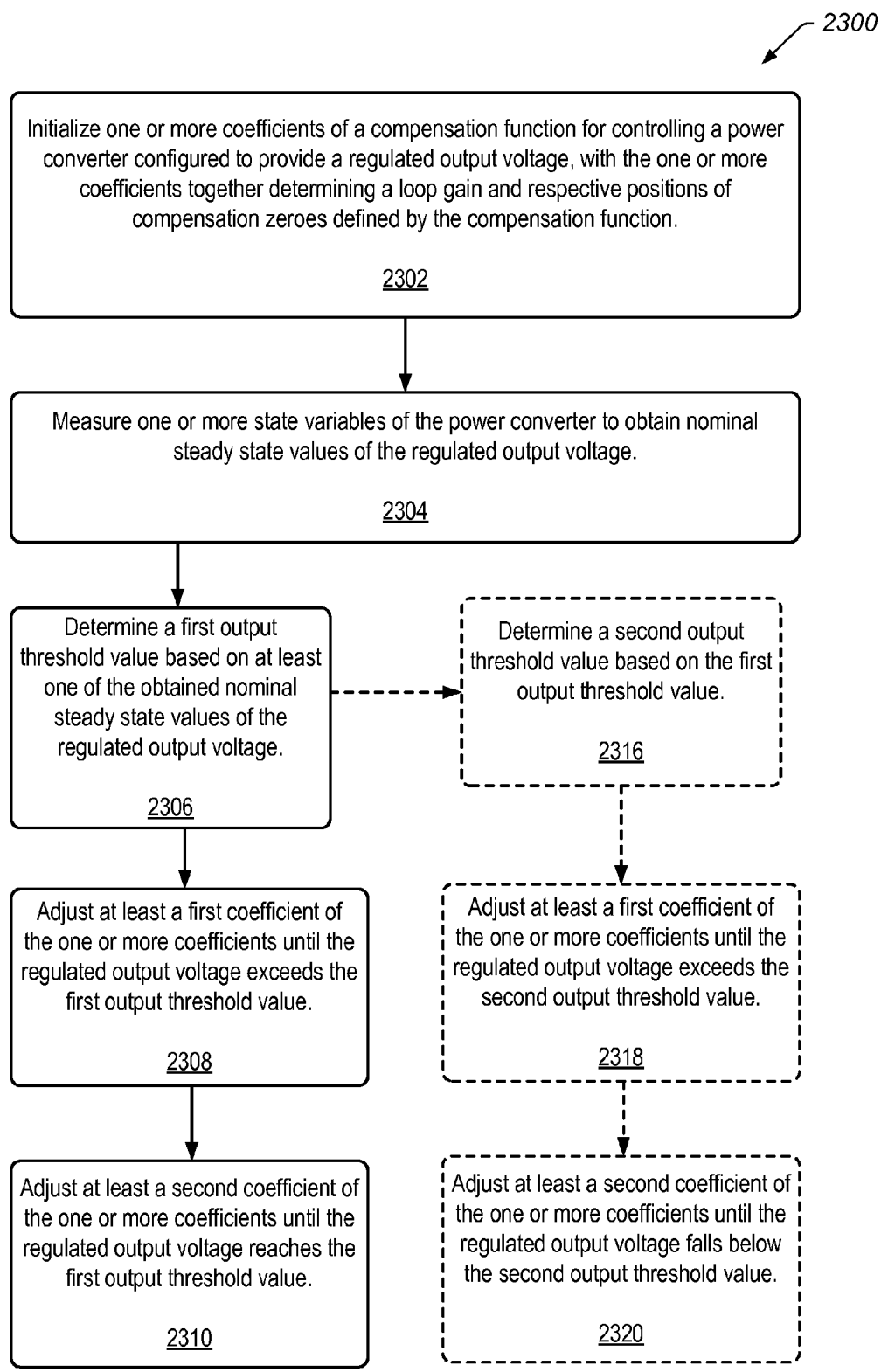
FIG. 22 shows a flow diagram of a method for performing auto-compensation according to one set of embodiments.

In one set of embodiments, auto-compensation may be performed according to the flow diagram shown in FIG. 22. While the method shown in FIG. 22 may be applicable to a variety of power converters and associated power plant models, the various actions depicted in flow diagram 2300 may be best understood in view of the power converters and power plant and compensator models discussed above, and depicted in FIGS. 1, 2, and 3. In general, auto-compensation may be performed in view of and/or according to advance knowledge of (or assumptions about) the type/structure of the power converter and filters. Accordingly, auto-compensation may be performed by first initializing one or more coefficients of a compensation function (2302), which is used for controlling a power converter configured to provide a regulated output voltage. The coefficients are specified such that one or more of the coefficients together determine a loop gain, e.g. DC loop gain, and respective positions of compensation zeros and/or compensation poles defined by the compensation function. Subsequently, one or more state variables of the power converter are measured to obtain nominal steady state values of the regulated output voltage (2304). The state variables may include, but may not be limited to, the regulated output voltage itself, inductor current, the value of the control signal or signals used in regulating the output voltage—e.g. value of the duty-cycle in case of a PWM control signal, such as the one for the converter shown in FIG. 1a—and the like.

A first output threshold value is then determined based on at least one of the obtained nominal steady state values of the regulated output voltage (2306), and at least a first coefficient of the one or more coefficients is adjusted until the regulated output voltage exceeds the first output threshold value (2308). Determination of whether the regulated output voltage has exceeded the first threshold value may also be made based on measurements of the one or more state variables. Once the regulated output voltage has exceeded the first output threshold value, at least a second coefficient of the one or more coefficients is adjusted until the regulated output voltage reaches the first output threshold value (2310). In some embodiments, the determined threshold value may represent a "quiet" threshold, corresponding to noise/jitter free operation. In alternate embodiments, a second output threshold value may be determined based on the first output threshold value (2316). This second threshold value may be a specified percentage above the first threshold value, and may represent a "noisy" threshold, corresponding to an output voltage level at which some noise/jitter may begin to manifest during operation. In this case, at least a first coefficient of the one or more coefficients is adjusted until the regulated output voltage exceeds the second output threshold value (2318), and once the regulated output voltage has exceeded the second output threshold value, at least a second coefficient of the one or more coefficients is adjusted until the regulated output voltage falls below the second output threshold value (2320).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for controlling a power converter the method comprising:
    initializing one or more coefficients of a compensation function, wherein the one or more coefficients determine a loop gain and respective positions of compensation zeros defined by the compensation function;
    subsequent to said initializing, operating the power converter according to at least the compensation function, the power regulator generating a regulated output voltage;
    measuring one or more state variables of the power converter during operation of the power converter;
    obtaining nominal steady state values of the regulated output voltage based on the measured one or more state variables;
    determining a first output threshold value based on at least one of the obtained nominal steady state values of the regulated output voltage;
    adjusting at least a first coefficient of the one or more coefficients of the compensation function until the regulated output voltage exceeds the first output threshold value; and
    adjusting at least a second coefficient of the one or more coefficients of the compensation function until the regulated output voltage reaches the first output threshold value.

2. The method of claim 1, wherein said measuring the one or more state variables of the power converter comprises measuring peak-to-peak deviation of the regulated output voltage;
    wherein the nominal steady state values of the regulated output voltage comprise a nominal peak-to-peak ripple value of the regulated output voltage; and
    wherein the at least one of the nominal steady state values of the regulated output voltage is the nominal peak-to-peak ripple value of the regulated output voltage.

3. The method of claim 2, wherein said determining the first output threshold value comprises setting the first output threshold value to be the obtained nominal peak-to-peak ripple value of the regulated output voltage.

4. The method of claim 1, wherein said initializing the one or more coefficients comprises assigning values to the one or more coefficients that result in one or more of:
    a single compensation pole near the origin; and
    a low DC (direct current) loop gain.

5. The method of claim 1, wherein the one or more coefficients also comprise a third coefficient;
    wherein said adjusting at least the first coefficient comprises increasing the first coefficient and the second coefficient; and
    wherein said adjusting at least the second coefficient comprises increasing the third coefficient.

6. The method of claim 5, further comprising:
holding the third coefficient constant during said increasing the first coefficient and the second coefficient.

7. The method of claim 5, further comprising:
adjusting the first coefficient and the second coefficient to keep a sum of the first, second and third coefficients constant during said increasing the third coefficient.

8. The method of claim 7, wherein said adjusting the first coefficient and the second coefficient comprises:
keeping the first coefficient equal to the second coefficient; and
keeping the sum of the first, second and third coefficients equal to a value corresponding to a current sum of the first coefficient and the second coefficient when the regulated output voltage exceeds the first output threshold value.

9. The method of claim 1, wherein said measuring the one or more state variables of the power converter comprises measuring one or more of:
the regulated output voltage;
respective values of one or more control signals used by the power converter in regulating the output voltage; or
an inductor current generated responsive to the regulated output voltage.

10. The method of claim 9, wherein said initializing comprises setting a single compensation pole near the origin.

11. The method of claim 1, wherein the one or more coefficients additionally determine respective positions of compensation poles defined by the compensation function.

12. The method of claim 1, wherein the loop gain is a DC (direct current) loop gain.

13. The method of claim 1, wherein the first output threshold corresponds to a minimum achievable stable regulated output voltage ripple for the power converter.

14. A method for controlling a power converter the method comprising:
initializing a loop gain coefficient, a compensation frequency coefficient, and a compensation quality factor coefficient of a compensation function;
obtain a unity gain frequency based on the loop gain coefficient, the compensation frequency coefficient and the compensation quality factor coefficient;
subsequent to said initializing, operating the power converter according to at least the compensation function, the power regulator generating a regulated output voltage;
during operation of the power converter, indicating when a peak-to-peak deviation of the regulated output voltage exceeds a first pre-determined threshold, and indicating when the regulated output voltage reaches the first pre-determined threshold;
obtaining an adjusted loop gain coefficient, comprising adjusting the loop gain coefficient until said indicating that the peak-to-peak deviation of the regulated output voltage exceeds the first pre-determined threshold; and
obtaining an adjusted compensation frequency coefficient, comprising adjusting the compensation frequency coefficient until said indicating that the regulated output voltage reaches the first pre-determined threshold.

15. The method of claim 14, further comprising adjusting the compensation quality factor coefficient until a specified compensation damping factor value is obtained, prior to said adjusting the compensation frequency coefficient.

16. The method of claim 15, wherein the obtained specified compensation damping factor value is substantially zero.

17. The method of claim 14, further comprising holding the compensation quality factor coefficient constant during said adjusting the compensation frequency coefficient.

18. The method of claim 14, wherein said adjusting the loop gain coefficient comprises increasing the loop gain coefficient.

19. The method of claim 14, wherein said adjusting the compensation frequency coefficient comprises decreasing the compensation frequency coefficient.

20. The method of claim 14, wherein the first pre-determined threshold corresponds to a measured average value of the peak-to-peak deviation of the regulated output voltage.

21. The method of claim 14, further comprising monitoring the peak-to-peak deviation of the regulated output voltage to detect when a phase margin of a control loop of the power converter is reduced, and when the control loop is in a near-instability region.

22. The method of claim 14, wherein said initializing comprises setting the loop gain coefficient to a value that ensures stable operation after power-up of the power converter for any practical component values of the power converter.

23. The method of claim 14, further comprising performing said initializing, said adjusting the loop gain coefficient, and said adjusting the compensation frequency coefficient before each ramp-up of the regulated output voltage, to account for shifting component values over time.

24. A system configured to provide compensation to a power converter according to a compensation function, wherein the power converter is configured to generate a regulated output voltage, the system comprising:
a processor; and
a memory element configured to store instructions executable by the processor to:
initialize one or more coefficients of the compensation function, wherein the one or more coefficients determine a DC loop gain and respective positions of compensation zeros defined by the compensation function;
during operation of the power converter, obtain measured values of the regulated output voltage, and determine nominal steady state values of the regulated output voltage according to the measured values of the regulated output voltage after the one or more coefficients have been initialized;
determine a first output threshold voltage value based on at least one of the determined nominal steady state values of the regulated output voltage;
adjust at least a first coefficient of the one or more coefficients until the regulated output voltage exceeds the first output threshold value; and
adjust at least a second coefficient of the one or more coefficients until the regulated output voltage reaches the first output threshold value.

25. The system of claim 24, further comprising:
a monitoring circuit configured to measure peak-to-peak deviation value of the regulated output voltage, and provide the measured peak-to-peak deviation value to the processor as the measured values of the regulated output voltage;
wherein the at least one of the nominal steady state values of the regulated output voltage is the nominal peak-to-peak ripple value of the regulated output voltage.

26. The system of claim 24, wherein to determine the first output threshold voltage value, the instructions are further executable to set the first output threshold voltage value to be a specified percentage above the determined nominal peak-to-peak ripple value of the regulated output voltage;

wherein the instructions stored in the memory element are further executable to continue adjusting the at least a second coefficient of the one or more coefficients until the regulated output voltage falls below the first output threshold value.

27. The system of claim 24, wherein to initialize the one or more coefficients, the instructions are further executable to assign values to the one or more coefficients that result in one or more of:
   a single compensation pole near the origin; and
   a low DC loop gain.

28. The system of claim 24, wherein the one or more coefficients further comprise a third coefficient;
   wherein for adjusting at least the first coefficient, the instructions are further executable to increase the first coefficient and the second coefficient; and
   wherein the instructions are further executable to increase the third coefficient while adjusting the second coefficient until the regulated output voltage reaches the first output threshold value.

29. The system of claim 28, wherein the instructions are further executable to hold the third coefficient constant while the first coefficient and the second coefficient are increased.

30. The system of claim 28, wherein the instructions are further executable to adjust the first coefficient and the second coefficient to keep a sum of the first, second and third coefficients constant while the third coefficient is increased.

31. The system of claim 30, wherein to adjust the first coefficient and the second coefficient to keep a sum of the first, second and third coefficients constant while the third coefficient is increased, the instructions are further executable to:
   keep the first coefficient equal to the second coefficient; and
   keep the sum of the first, second and third coefficients equal to a value corresponding to a current sum of the first coefficient and the second coefficient when the regulated output voltage first exceeds the first output threshold value.

32. A method for controlling a power converter, the method comprising:
   initializing one or more coefficients of the compensation function, wherein the one or more coefficients determine a loop gain and respective positions of compensation zeros defined by the compensation function;
   subsequent to said initializing, operating the power converter according to at least the compensation function, the power converter generating a regulated output voltage;
   measuring one or more state variables of the power converter during operation of the power converter;
   obtaining nominal steady state values of the regulated output voltage based on the measured one or more state variables;
   determining a first output threshold value based on at least one of the obtained nominal steady state values of the regulated output voltage;
   adjusting at least a first coefficient of the one or more coefficients until the regulated output voltage exceeds the first output threshold value; and
   adjusting at least a second coefficient of the one or more coefficients until the regulated output voltage falls below the first output threshold value.

33. The method of claim 32, wherein said determining the first output threshold value comprises setting the first output threshold value to be a specified percentage above a minimum achievable peak-to-peak ripple value of the regulated output voltage at which jitter on the regulated output voltage is within specified limits.

* * * * *